(12) United States Patent
Inoue et al.

(10) Patent No.: US 10,638,542 B2
(45) Date of Patent: Apr. 28, 2020

(54) GATEWAY DEVICE AND COMMUNICATION SYSTEM

(71) Applicant: SEIKO EPSON CORPORATION, Tokyo (JP)

(72) Inventors: Katsutoyo Inoue, Azumino (JP); Yasumasa Nakajima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/082,648

(22) PCT Filed: Feb. 17, 2017

(86) PCT No.: PCT/JP2017/005903
§ 371 (c)(1),
(2) Date: Sep. 6, 2018

(87) PCT Pub. No.: WO2017/154521
PCT Pub. Date: Sep. 14, 2017

(65) Prior Publication Data
US 2019/0029074 A1 Jan. 24, 2019

(30) Foreign Application Priority Data
Mar. 7, 2016 (JP) .................. 2016-043095

(51) Int. Cl.
*H04W 88/16* (2009.01)
*H04L 12/66* (2006.01)
(Continued)

(52) U.S. Cl.
CPC .............. *H04W 88/16* (2013.01); *H04L 12/66* (2013.01); *H04L 67/12* (2013.01); *H04L 69/08* (2013.01);
(Continued)

(58) Field of Classification Search
CPC ......... H04W 88/16; H04W 4/70; H04W 4/80; H04W 88/02; H04W 4/38; H04W 4/90;
(Continued)

(56) References Cited

U.S. PATENT DOCUMENTS 5,761,194 A * 6/1998 Bahlenberg .......... H04B 7/2606
370/315
9,426,837 B2 * 8/2016 Abraham ................. H04B 7/14
(Continued)

FOREIGN PATENT DOCUMENTS

| JP | 2006-319555 A | 11/2006 |
| JP | 2006-343800 A | 12/2006 |
| JP | 2009-232379 A | 10/2009 |

OTHER PUBLICATIONS

May 16, 2017 International Search Report issued in International Patent Application No. PCT/JP2017/005903.

*Primary Examiner* — Afshawn M Towfighi
(74) *Attorney, Agent, or Firm* — Oliff PLC

(57) ABSTRACT

A gateway device includes: a first communication unit that communicates with an electronic device; a second communication unit that communicates with a computer communication network; a third communication unit that communicates with a gateway device different from the gateway device and has a different communication scheme from the second communication unit; and a processing unit that controls communication. The processing unit performs control such that the electronic device and the computer communication network are able to communicate with each other via the second communication unit when the second communication unit is able to communicate with the computer communication network, and performs control such that the third communication unit enables the electronic device and the computer communication network to communicate with each other via the gateway device when the second communication unit is not able to communicate with the computer communication network.

24 Claims, 13 Drawing Sheets

(51) Int. Cl.
  *H04L 29/14* (2006.01)
  *H04W 4/90* (2018.01)
  *H04L 29/06* (2006.01)
  *H04L 29/08* (2006.01)
  *H04W 4/38* (2018.01)
  *H04L 5/14* (2006.01)
  *H04W 88/02* (2009.01)

(52) U.S. Cl.
  CPC ............... *H04L 69/40* (2013.01); *H04W 4/38* (2018.02); *H04W 4/90* (2018.02); *H04L 5/14* (2013.01); *H04W 88/02* (2013.01)

(58) Field of Classification Search
  CPC . H04L 12/66; H04L 5/14; H04L 67/12; H04L 69/08; H04L 69/40
  See application file for complete search history.

(56) References Cited

U.S. PATENT DOCUMENTS

| | | | | |
|---|---|---|---|---|
| 2009/0245163 | A1* | 10/2009 | Inoue | H04W 24/04 370/315 |
| 2016/0029375 | A1* | 1/2016 | Kato | H04W 72/0426 370/329 |
| 2016/0174277 | A1* | 6/2016 | Yoon | H04W 76/14 370/338 |

* cited by examiner

GATEWAY DEVICE AND COMMUNICATION SYSTEM

TECHNICAL FIELD

The present invention relates to a gateway device and a communication system.

BACKGROUND ART

In recent years, Internet of Things (IoT) which is a technology for connecting various objects in the world to the Internet has been noticed. Effective utilization of electronic devices is preferable in view of contribution to realization of IoT.

For example, wearable devices which are electronic devices worn on human bodies become popular. Such wearable devices can supply valuable information necessary to users by acquiring information regarding human bodies or actions of the users with high precision. Therefore, wearable devices are requested to have excellent constant wearing properties or constant connectivity to computer communication networks such as the Internet to analyze the acquired information rapidly.

To meet such requests, the following PTL 1 discloses a terminal device that ensures constant connectivity through multi-hop communication so that the outside (family members, friends, or the like) can be informed of safety or situation of a user when natural disasters such as large earthquakes, fires, tropical storms, or flood damages occur.

CITATION LIST

Patent Literature

PTL 1: JP-A-2006-319555

SUMMARY OF INVENTION

Technical Problem

However, to maintain wearing properties of human bodies, electronic devices such as wearable devices are required to have small-sized batteries and realize small sizes and light weights of the electronic devices and suppress power consumption small. Thus, when long-time communication may not stand by and power such as AC power may not be supplied to be charged, it is difficult to maintain constant connection. When it is difficult to widen communicable areas and distribution of terminal devices capable of performing multi-hop communication at midnight, in natural disasters, or the like is sparse, connection to computer communication networks becomes unstable and it is difficult to continue stable communication.

The invention has been made in view of the above-described problems and an object of the invention is to provide a communication network capable of maintaining connection to a computer communication network for a long time and stably.

Solution to Problem

The invention has been made to resolve at least a part of the problems described above and can be implemented as the following aspects or application examples.

APPLICATION EXAMPLE 1

A gateway device according to this application example includes: a first communication unit that communicates with an electronic device; a second communication unit that communicates with a computer communication network; a third communication unit that communicates with a second gateway device different from the gateway device and has a different communication scheme from the second communication unit; and a control unit that controls communication by the first communication unit, the second communication unit, and the third communication unit. The control unit performs control such that the electronic device and the computer communication network are able to communicate with each other via the second communication unit when the second communication unit is able to communicate with the computer communication network, and performs control such that the third communication unit enables the electronic device and the computer communication network to communicate with each other via the second gateway device when the second communication unit is not able to communicate with the computer communication network.

According to this configuration, the electronic device communicating with the first communication unit and the computer communication network are able to communicate with each other via the second communication unit when the second communication unit is able to communicate with the computer communication network. The third communication unit enables the electronic device and the computer communication network to communicate with each other via the second gateway device different from the electronic device when the second communication unit is not able to communicate with the computer communication network. Even when the second communication unit is not able to communicate with the computer communication network due to a fault, it is possible to maintain the communication between the electronic device and the computer communication network and continue stable communication.

APPLICATION EXAMPLE 2

In the gateway device according to the application example, it is preferable that the third communication unit is further able to communicate with a third gateway device, and when the second communication unit is able to communicate with the computer communication network, the control unit performs control such that the electronic device and the computer communication network connected to the third gateway device are able to communicate with each other via the second communication unit, and when the second communication unit is not able to communicate with the computer communication network, the control unit performs control such that the third communication unit enables the electronic device and the computer communication network connected to the third gateway device to communicate with each other via the second gateway device.

According to this configuration, even when the electronic device connected to the third gateway device is not able to communicate with the computer communication network, it is possible to maintain the communication between the electronic device and the computer communication network via the second gateway device.

APPLICATION EXAMPLE 3

In the gateway device according to the application example, it is preferable that the gateway device is installed in at least one kind of structure such as an outside lamp, a telegraph pole, a vending machine, a traffic signal, and a surveillance camera.

According to this configuration, it is possible to install the gateway device at a communicable interval.

APPLICATION EXAMPLE 4

The gateway device according to the application example, it is preferable that the gateway device further includes a power generation unit that generates power from natural energy, and at least the first communication unit and the third communication unit are driven with the power generated by the power generation unit.

According to this configuration, it is possible to realize a sustainable communication network, even when power is not supplied from the outside, to drive the communication units using the power generated based on natural energy.

APPLICATION EXAMPLE 5

In the gateway device according to the application example, the natural energy may be one of solar light, wind power, ocean current, geotherm, and a natural gas.

APPLICATION EXAMPLE 6

In the gateway device according to the application example, it is preferable that a communication scheme of the first communication unit is one of Bluetooth (registered trademark), Wi-SUN (registered trademark), ZigBee (registered trademark), and IP500 (registered trademark).

According to this configuration, it is possible to perform communication with low power consumption.

APPLICATION EXAMPLE 7

In the gateway device according to the application example, the first communication unit and the third communication unit may have the same communication scheme.

APPLICATION EXAMPLE 8

In the gateway device according to the application example, the second communication unit may perform communication with the computer communication network by wired connection.

APPLICATION EXAMPLE 9

In the gateway device according to the application example, the second communication unit may perform communication with the computer communication network by a mobile phone communication network.

APPLICATION EXAMPLE 10

In the gateway device according to the application example, it is preferable that, when the electronic device is connected to another gateway device for communication and a given deletion condition is established, a process of deleting information received from the electronic device or information to be transmitted to the electronic device is performed.

According to this configuration, it is possible to prevent the reception information or the transmission information from being unnecessarily retained in the storage unit of the gateway device, and thus it is possible to achieve saving of a use storage capacity of the storage unit.

APPLICATION EXAMPLE 11

A communication system according to this application example includes the gateway device described above and a connected electronic device.

According to this configuration, the electronic device communicating with the first communication unit and the computer communication network are able to communicate with each other via the second communication unit when the second communication unit is able to communicate with the computer communication network. The third communication unit enables the electronic device and the computer communication network to communicate with each other via the second gateway device different from the electronic device when the second communication unit is not able to communicate with the computer communication network. Even when the second communication unit is not able to communicate with the computer communication network due to a fault, it is possible to maintain the communication between the electronic device and the computer communication network and continue stable communication.

DESCRIPTION OF EMBODIMENTS

Hereinafter, embodiments of the invention will be described with reference to the drawings.

(Embodiment)

Hereinafter, a preferred embodiment of the invention will be described in detail. The embodiment to be described below does not inappropriately limit content of the invention described in Summary of Invention and all of the configurations to be described in the embodiment are not prerequisite as solutions to the problems.

1. Overall Configuration

Figure 1:
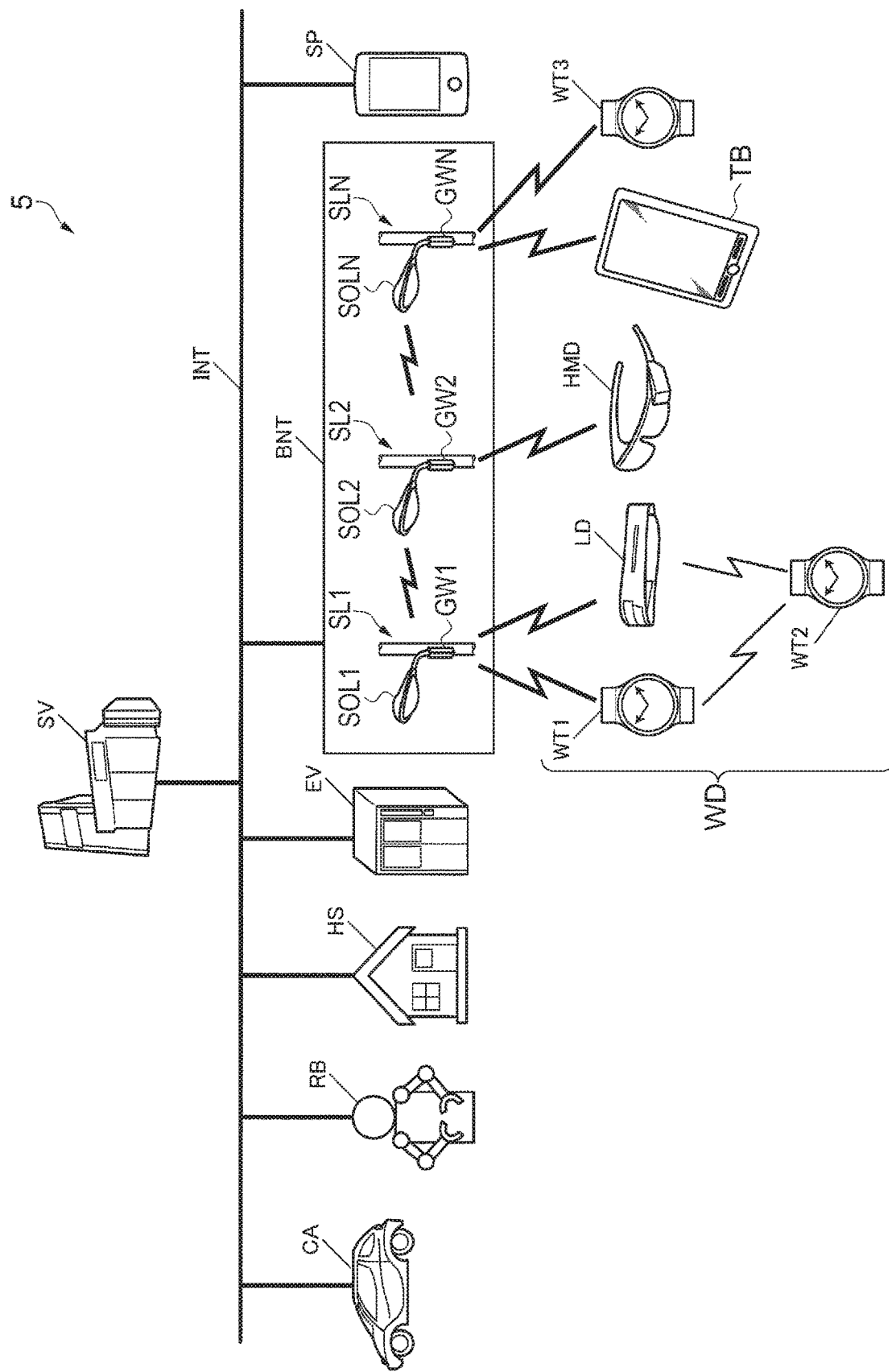
FIG. 1 is a diagram illustrating an overall configuration example of a communication system according to an embodiment.

FIG. 1 is a diagram illustrating an overall configuration example of a communication system 5 according to an embodiment. As illustrated in FIG. 1, the communication system 5 according to the embodiment includes electronic devices WD, a short-range wireless communication network BNT, and a computer communication network INT. The communication system 5 can include a server SV or control targets (EV, HS, RB, and CA).

The computer communication network INT is assumed to be, for example, the Internet which is one of the networks based on the communication standard of TCP/IP. In the computer communication network INT, a computer on the network can be individually identified with a unique IP address. The computer communication network INT is a wide area network (WAN) to which the server SV can communicate to be connected. Further, the computer communication network INT can include a cable network such as optical fibers, a mobile phone communication network, or a wireless LAN communication network. Either wired connection or wireless connection can be used as a communication method.

The short-range wireless communication network BNT is a communication network that includes a plurality of gateway devices GW1 to GWN (access points) and can be connected to the computer communication network INT. The gateway devices GW1 to GWN are, for example, devices to which many unspecified devices (devices of many unspecified users) can be connected. The gateway devices GW1 to GWN can also be connected to each other. For example, the gateway device GW2 can be connected to the nearby gateway device GW1 and gateway device GWN.

In the embodiment, the gateway devices GW1 to GWN are installed in streetlamps (outside lamps) SL1 to SLN. Solar panels SOL1 to SOLN are established in the streetlamps SL1 to SLN. The gateway devices GW1 to GWN can be driven with power generated through solar power generation.

Locations in which the gateway devices GW1 to GWN are installed are not limited to only the streetlamps SL1 to SLN. For example, the locations may be structures such as telegraph poles, traffic signals, fire plugs, radio towers, and surveillance cameras or structures equivalent thereto or may be private structures or facilities such as vending machines, garages, and porch lamps. The installation locations may include smart meters that measure use amounts of electricity, gas, water supply, or the like. That is, gateway devices GW1 to GWN may be installed in at least one or more kind of these locations. The installed gateway devices GW1 to GWN may be relocated.

As the short-range wireless communication network BNT, for example, a communication network of Bluetooth (registered trademark: the same applies below) can be used. The gateway devices GW1 to GWN may be realized by Bluetooth routers or the like. The short-range wireless communication network BNT may be communication networks formed in geographically separated wide areas such as WAN or may be a communication network formed in a specific district such as LAN. The short-range wireless communication network BNT may be a communication network formed in a district such as an amusement facility, a shopping mall, a company, or a factory.

In the embodiment, as a communication scheme of the short-range wireless communication network BNT, a communication scheme capable of performing duplex communication with low power consumption, such as ZigBee (registered trademark), Wi-SUN (registered trademark), IP 500 (registered trademark), or ANT in addition to Bluetooth can be adopted.

ZigBee is a wireless standard in which a ZigBee alliance defines a specification and an operation is performed with saving power, and operates on IEEE 802.15.4. Three kinds of nodes, a coordinator, a router, and an end device, are defined as nodes for ZigBee. As a basic operation of ZigBee, an end device normally sleeps with saving power, wakes up with a trigger signal from a timer or the like, transmits data to a router or a coordinator, and transitions to sleeping again. Because of the transition to the sleeping, power saving of the end device is achieved. On the other hand, the router and the coordinator normally stand by in a reception state and waits for the data from the end device.

Wi-SUN is a wireless communication standard in which a terminal is mounted on a meter or the like for gas, electricity, or water supply to collect data efficiently using wireless communication. In Wi-SUN, communication is performed with radio waves of a frequency band before and after 900 MHz called a sub-gigahertz band. Therefore, compared to short-range wireless communication of a 2.4 GHz band, WI_SUN has characteristics in which interference with other devices or the like is small and radio waves easily arrive even when there is an obstacle. The specification of the physical layer of Wi-SUN is standardized to IEEE 802.15.4g, and thus a plurality of terminals relay data in accordance with a bucket relay scheme and also correspond to multi-hop communication connecting remote locations to each other.

The short-range wireless communication network BNT is not limited to the above-described communication networks. For example, any communication network can be applied as long as the communication network is a communication network of which power consumption is small, such as average communication power consumption of about 3 μW. For example, communication in which a sound wave or light is used as a carrier wave in addition to a radio wave can also be assumed.

In FIG. 1, wearable device such as watches WT1 to WT3 (wristwatches), a wrist type biological sensor device LD, and a head mounted display device HMD, and a multifunctional portable terminal such as a tablet TB are connected as electronic devices WD to the short-range wireless communication network BNT (the gateway devices GW1 to GWN) for communication.

The watches WT1 to WT3 are wrist type electronic devices and are called, for example, GPS built-in watches, smart watches, divers watches, or solar watches. The watches WT1 to WT3 each include, for example, a hand movement mechanism of indicators (a second hand, a minute hand, and an hour hand). The watches WT1 to WT3 each include various sensors such as a position sensor (GPS or the like), an environment sensor (a sensor for temperature, humidity, atmospheric pressure, geomagnetism, weather, or the like), a body motion sensor (an acceleration sensor, a gyro sensor, or the like), or a biological sensor detecting biological information. The watches WT1 to WT3 may each include a display panel instead of indicators.

The biological sensor device LD can measure biological information such as a pulse rate, an active amount, a blood pressure, oxygen saturation, a body temperature, or a bioelectric potential. Specifically, the biological sensor device LD is a wrist type electronic device (a wrist type biological sensor) and is a wrist type pulse wave meter or active amount meter. The HMD is a display device that is worn on the head of a user. The HMD may be a non-transmissive type device that completely covers the eyes of a user or a transmissive type (glasses type or the like) device. The HMD can also include a sensor such as a position sensor, an environment sensor, a body motion sensor, or a biological sensor described above.

In FIG. 1, the watch WT2 is connected to the gateway device GW1 of the short-range wireless communication network BNT for communication via the watch WT1 or the biological sensor device LD. The communication connection can be realized by, for example, a piconet or a scatternet which is an ad-hoc network. The electronic devices WD according to the embodiment are not limited to the devices exemplified in FIG. 1. For example, various devices which can be worn on various parts (a chest, an abdomen, a leg, a neck, and a finger) of a user can also be assumed.

In FIG. 1, an elevator EV, a smart house HS, a robot RB, and a car CA are connected as control targets (control target devices) to the computer communication network INT for communication.

The elevator EV is an elevator installed in a company, a facility, an individual house, or the like. The smart house HS is a house in which household electric appliances or equipment devices are connected for communication with information wirings or the like for optimum control. The robot RB is, for example, a double-arm or single-arm robot, and may be an industrial robot used in a factory or the like or may be a non-industrial (medical, welfare, security, communication, or entertainment) robot. The car CA is, for example, a known internal combustion car, a hybrid car, an electric car, or a fuel cell vehicle. The car CA may be a two-wheeled vehicle such as a motorbike.

The elevator EV, the smart house HS, the robot RB, or the car CA may be remotely adjusted via the computer communication network INT such as the Internet using loose coupling short-range wireless communication with the electronic devices WD and the gateway devices.

Figure 2:
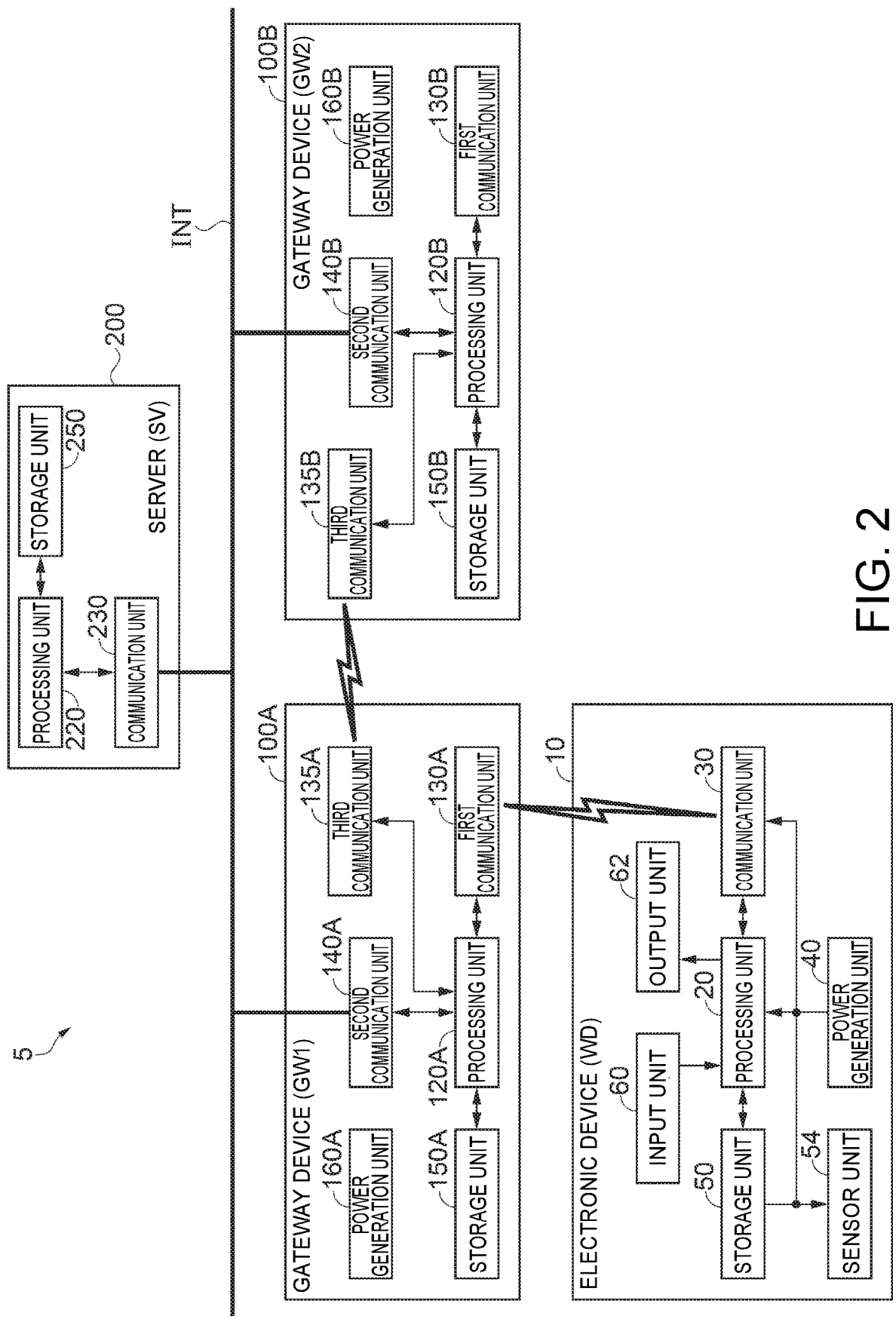
FIG. 2 is a diagram illustrating configuration examples of an electronic device, a gateway device, and a server.

FIG. 2 is a diagram illustrating a configuration example of the communication system 5 according to the embodiment. In the communication system 5, a server 200, gateway devices 100A and 100B, and an electronic device 10 are respectively assumed as an example of the server SV, the gateway devices GW, and the electronic device WD.

The gateway devices 100A and 100B are assumed to have the same configuration. Therefore, in the following description, the gateway device 100A will be described. Hereinafter, the plurality of gateway devices 100A, 100B, and 100C (see FIG. 11) are collectively referred to as the gateway devices 100.

The electronic device 10 includes a processing unit 20, a communication unit 30, a power generation unit 40, a storage unit 50, a sensor unit 54, an input unit 60, and an output unit 62. The gateway device 100A includes a processing unit 120A, a first communication unit 130A, a second communication unit 140A, a third communication unit 135A, a storage unit 150A, and a power generation unit 160A. The server 200 includes a processing unit 220, a communication unit 230, and a storage unit 250. The configurations of the electronic device 10, the gateway device 100A, and the server 200 are not limited to the configurations illustrated in FIG. 2 and may be modified in various forms by omitting some of the constituent elements, adding other constituent elements, or changing connection relations.

The processing units 20, 120A, and 220 (processor) process or control various kinds of information. Each process (each function) performed by each of the processing units 20, 120A, and 220 according to the embodiment can be realized by a processor (a processor including hardware). For example, each process according to the embodiment can be realized by the processor operating based on information such as a program and a memory (the storage units 50, 150A, and 250) that stores the information such as a program.

The processing unit 120A is equivalent to a control unit that controls communication by the first communication unit 130A, the second communication unit 140A, and the third communication unit 135A. In the embodiment, one processing unit 120A is assumed to control the first communication unit 130A, the second communication unit 140A, and the third communication unit 135A, but a plurality of control units can be assumed to control the first communication unit 130A, the second communication unit 140A, and the third communication unit 135A, respectively.

As the processor, for example, a function of each unit may be realized by individual hardware or a function of each unit may be realized by integrated hardware. The processor may be, for example, a central processing unit (CPU). Here, the processor is not limited to the CPU, but any of various processors such as a graphics processing unit (GPU) or a digital signal processor (DSP) can be used. The processor may be a hardware circuit realized as an ASIC or a system on chip (SoC).

The memory (the storage units 50, 150A, and 250) may be a semiconductor memory such as an SRAM, a DRAM, or a flash memory or may be register. Alternatively, the memory may be a magnetic storage device such as a hard disk device (HDD) or may be an optical storage device such as an optical disc device. For example, the memory stores a command which can be read by a computer. A process (function) of each of the processing units 20, 120A, and 220 is realized when the processor performs the command. Here, the command may be a command set that forms a program or may be a command used to instruct a hardware circuit of the processor to perform an operation.

The communication unit 30, the first communication unit 130A, and the third communication unit 135A are circuits (IC) that perform short-range wireless communication of the short-range wireless communication network BNT illustrated in FIG. 1. The communication unit 30, the first communication unit 130A, and the third communication unit 135A are circuits that perform short-range wireless communication of various standards such as Bluetooth, ZigBee, and Wi-SUN. The communication unit 30, the first communication unit 130A, and the third communication unit 135A can be realized by a communication firmware or hardware such as a communication ASIC or a communication processor. Specifically, the communication unit 30, the first communication unit 130A, and the third communication unit 135A include for example, a physical layer circuit and a logic circuit realizing a link layer circuit or the like.

The physical layer circuit includes a reception circuit and a transmission circuit. The reception circuit includes a low-noise amplifier amplifying an RF reception signal from an antenna (not illustrated) with low noise, a mixer, and a filter. The transmission circuit includes a power amplifier outputting a transmission signal to an antenna (not illustrated). The logic circuit can include a demodulation circuit, a modulation circuit, a reception buffer, a transmission buffer, a processing circuit, and an interface circuit.

The first communication unit 130A is assumed to communicate with the communication unit 30 of the electronic device 10. The third communication unit 135A is assumed to communicate with a third communication unit 135B of another gateway device (the second gateway device: for example, 100B) within a communicable distance different from the gateway device.

The first communication unit 130A and the third communication unit 135A can perform one-to-multiple communication, and a frequency band to be used is equal to or less than 5 GHz and is assumed to be up to sub-gigahertz. In the embodiment, the first communication unit 130A and the third communication unit 135A may conform to the same standard or may conform to different standards among Bluetooth, ZigBee, and Wi-SUN communication schemes. When the first communication unit 130A and the third communication unit 135A conform to the same standard, at least one of hardware and communication firmware may be common.

The second communication unit 140A and the communication unit 230 perform a process for communication using the computer communication network INT such as the Internet in accordance with a scheme different from the communication scheme of the first communication unit 130A and the third communication unit 135A, for example, a wireless communication scheme such as Long Term Evolution (LTE), Personal Handy-phone System (PHS), WiMAX (registered trademark), or Wi-Fi (registered trademark) or a wired communication scheme such as optical fiber communication. The second communication unit 140A and the communication unit 230 can be realized by a communication ASIC, hardware such as a communication processor, or communication firmware. For example, the second communication unit 140A and the communication unit 230 perform a process for communication in accordance with the specification of Ethernet (registered trademark) as a process for the physical layer or the data link layer. A process for communication in accordance with the specification of TCP/IP is performed as a process for the network layer or the transport layer.

In this case, the processing unit 120A of the gateway device 100A performs protocol conversion between, for example, the protocol (for example, Bluetooth) of the short-range wireless communication network BNT and the protocol (for example, Ethernet and TCP/IP) of the computer communication network INT. For example, the processing unit 120A performs a process of reconstructing packets of the protocol of the short-range wireless communication network BNT into packets of the protocol of the computer communication network INT or reconstructing packets of the protocol of the computer communication network INT into the packets of the protocol of the short-range wireless communication network BNT. For example, a process of converting address information (for example, a MAC address of Bluetooth) of the device into address information (for example, IPv6 of TCP/IP) for the computer communication network INT is performed.

As the communication between the second communication unit 140A and the communication unit 230, power line communication in which a power line supplying power to the streetlamps SL1 to SLN is used as a communication line can also be assumed.

The storage units 50, 150A, and 250 (memory) store various kinds of information and function as work areas or the like of the processing units 20, 120A, and 220 or the communication units 30 and 230, the first communication unit 130A, the second communication unit 140A, and the third communication unit 135A. Various kinds of information such as data or programs for realizing various processes of the processing units 20, 120A, 220, and the like are stored in the storage units 50, 150A, and 250. The storage units 50, 150A, and 250 can be realized by semiconductor memories (DRAM or VRAM), hard disk drives (HDD), or the like.

The power generation unit 40 included in the electronic device 10 generates power for operating the electronic device 10. The processing unit 20 operates with power from the power generation unit 40 to process information (data and a signal). The communication unit 30 operates with the power from the power generation unit 40 to perform loose coupling short-range wireless communication with the gateway device 100A which is an external device. The power from the power generation unit 40 is supplied to the storage unit 50, the sensor unit 54, and the like. Power generation by the power generation unit 40 may be realized by environmental power generation (energy harvesting) such as solar power generation (solar cell) or may be realized by vibration power generation, hand-rolled power generation, or temperature difference power generation. The power generation unit 40 may include a secondary cell (a charge storage capacitor or a battery: not illustrated) that charges generated power.

The power supplied to the electronic device 10 by the power generation unit 40 is not necessarily limited to power generated by power generation. For example, when a condition or the like that it is not necessary to exchange a battery for at least one year is satisfied, power supplied to the electronic device 10 may be power from a button battery or similar battery contained in a normal watch (wristwatch). According to the invention, since low power consumption can be realized considerably compared to a technology of the related art, there is the advantage that it is not necessary to frequently exchange a battery even in this case.

The communication scheme of the communication unit 30 is preferably a low consumption current. In the embodiment, the same communication scheme (format) as the first communication unit 130A is adopted.

The sensor unit 54 can include, for example, a biological sensor, a position sensor, a motion sensor, or an environment sensor. The biological sensor is, for example, a sensor that measures biological information such as a pulse rate (pulse wave), an active amount, a blood pressure, oxygen saturation, a body temperature, or a bioelectric potential. For example, the biological sensor can be realized by an optical sensor that includes a light-emitting unit such as an LED and a light-receiving unit such as a photodiode. For example, when light from the light-emitting unit is radiated to the skin of a wrist and reflected light with information regarding a blood flow is incident on the light-receiving unit, biological information such as a pulse rate, oxygen saturation, or a bold pressure can be measured.

An active amount such as consumed calories can also be calculated. The position sensor is a sensor that detects the position of the electronic device 10 and can be realized by GPS or the like. The motion sensor detects a motion of the electronic device 10 or a motion of a user (a motion of a body or an action state such as walking or running) and can be realized by, for example, an acceleration sensor or a gyro sensor. The environment sensor is a sensor that detects an environmental situation around the electronic device 10 and can be realized by a temperature sensor, a humidity sensor, an atmospheric pressure sensor, a geomagnetic sensor, or the like.

The input unit 60 inputs various signals or various kinds of information. The input unit 60 can be realized by, for example, an operation unit that includes an operation button, a voice input unit such as a microphone, or a touch panel display. The output unit 62 outputs various signals or various kinds of information. The output unit 62 can be realized by, for example, a display unit such as a liquid crystal display (LCD) or an organic EL display, a sound output unit such as a speaker, a light-emitting unit such as LED, or a vibration generation unit such as a vibration motor. For example, a reporting process according to the embodiment can be realized by such a display unit, a sound output unit, a light-emitting unit, or a vibration generation unit.

The power generation unit 160A included in the gateway device 100A generates power for operating the gateway device 100A. At a normal time, the gateway device 100A can obtain power from a commercial power supply supplying the power to the streetlamps SL1 to SLN, a telegraph pole, a vending machine, a traffic signal, and a surveillance camera in which the gateway device 100A is installed.

When a commercial power supply fails or a commercial power supply may not be used, the gateway device 100A can use power generated by the power generation unit 160A to operate each functional unit.

In the embodiment, the power generation unit 160A is assumed to generate solar power by a solar cell included in each of the solar panels SOL1 to SOLN. The power generation unit 160A is not limited to the solar power generation as long as natural energy is used to generate power. For example, power generation (energy harvesting) can also be used using wind power, ocean current, geotherm, a natural gas, vibration, heating power, or water power.

The power generation unit 160A may include a secondary cell (a charge storage capacitor or a battery: not illustrated) that charges power generated by a solar cell or power acquired from a commercial power supply.

2. Communication System

In the communication system 5 according to the embodiment, communication using loose coupling short-range wireless communication is performed. Hereinafter, a communication scheme according to the embodiment will be described in detail.

Figure 3A:
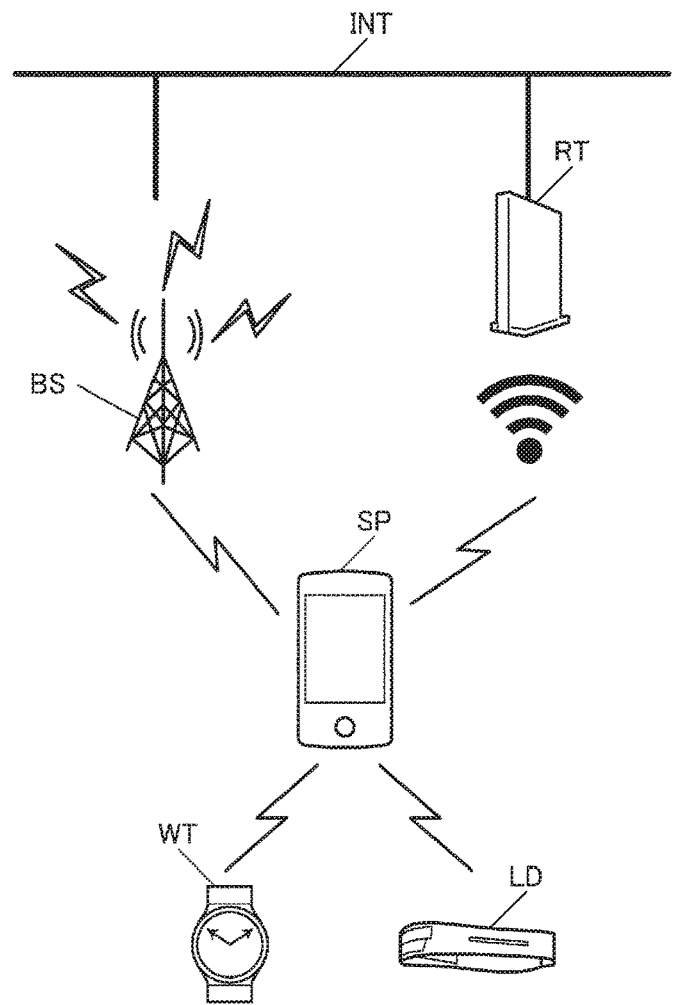
FIG. 3A is a diagram illustrating a scheme according to a comparative example of the embodiment.
Figure 3B:
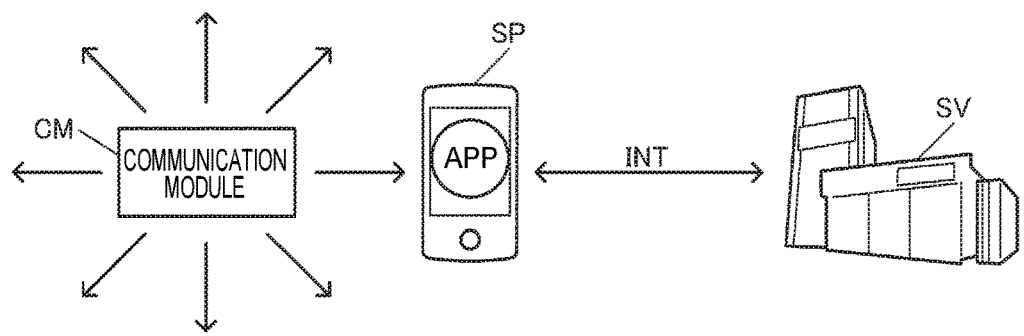
FIG. 3B is a diagram illustrating a scheme according to a comparative example of the embodiment.

FIGS. 3A and 3B are diagrams illustrating a communication scheme according to a comparative example of the embodiment. In the comparative example of FIG. 3A, the electronic devices WD such as the watch WT and the biological sensor device LD are connected to the computer communication network INT such as the Internet via the portable information communication terminal SP such as a smartphone or a table PC. For example, the electronic devices WD and the information communication terminal SP are connected by short-range wireless communication such as Bluetooth.

The information communication terminal SP and the computer communication network INT are connected via a base station BS or a router RT. For example, the information communication terminal SP and the base station BS are connected with a mobile phone communication network, and the information communication terminal SP and the router RT are connected with a wireless communication network (wireless LAN) such as Wi-Fi. Hereinafter, the computer communication network INT is appropriately referred to as the Internet.

Even in the comparative example of FIG. 3A, connection to the Internet can be realized in which information regarding the electronic device WD is uploaded to the Internet (INT) or information regarding the Internet is downloaded to the electronic device WD. However, to connect the electronic device WD to the Internet, the information communication terminal SP is necessary. In general, the information communication terminal SP is greater than the electronic device WD and is not constantly carried by a user in some cases. In this case, the electronic device WD alone may not be connected to the Internet. In general, the information communication terminal SP has power consumption higher than the electronic device WD and is out of battery in some cases. In this case, the information communication terminal SP may not be connected to the Internet either. Therefore, there is the problem that it is difficult to maintain constant connection of the electronic device WD to the Internet.

For example, to acquire biological information or lifelog information of active information regarding a user measured by the electronic device WD, the electronic device WD constantly worn on the user is preferably constantly connected to the network. However, in the comparative example of FIG. 3A, it is difficult to realize the constant connection of the electronic device to the network. When a natural disaster occurs, the information communication terminal SP may not be charged by an AC power supply due to power failure, and thus it is also difficult to realize reporting natural disaster information by the electronic device WD since the information communication terminal SP is out of battery.

A scheme of directly connecting the electronic device WD to the router RT by Wi-Fi can be considered, but power consumption of the communication unit of the electronic device WD may be excessive in this scheme. Therefore, it is necessary to frequently charge the electronic device WD or frequently change a battery. Thus, constant wearing properties or constant connectivity of the electronic device WD may be hindered.

In the comparative example of FIG. 3B, a communication module CM installed in a store or an amusement facility transmits, for example, a beacon to its periphery. When the user carrying the information communication terminal SP approaches the communication module CM, the information communication terminal SP receives a beacon and a corresponding application (application program) is activated. Then, the information processing terminal SP is connected to the Internet (INT) by the activated application and, for example, advertisement information of the store or guide information regarding the facility from the server SV is downloaded to the information communication terminal SP.

In the comparative example of FIG. 3B, the information communication terminal SP is connected to the Internet rather than the electronic device WD. The transmission of the beacon is simplex communication and does not correspond to duplex communication. Therefore, in the comparative example of FIG. 3B, there is the problem that a scheme of constantly connecting the electronic device WD to the Internet and transmitting and receiving information may not be realized.

To resolve the foregoing problem, in the embodiment, a scheme of directly connecting the electronic device WD to a computer communication network such as the Internet through the loose coupling short-range wireless communication is adopted. Specifically, as illustrated in FIGS. 1 and 2, the communication system 5 according to the embodiment includes the gateway devices 100A (GW1 to GWN) which can connect the electronic devices 10 (WT1 to WT3, LD, HMD, and TB) to many unspecified devices and includes the short-range wireless communication network BNT which can be connected to the computer communication network INT.

As illustrated in FIG. 2, the electronic device 10 includes the power generation unit 40 that generates power, the processing unit 20 that operates with the power from the power generation unit 40 and processes information, and the communication unit 30 that operates with the power from the power generation unit 40 and performs the loose coupling short-range wireless communication with an external device.

The electronic device 10 (the communication unit 30) is connected to the gateway device 100A (the first communication unit 130A) for communication by the loose coupling short-range wireless communication and is connected to the computer communication network INT for communication via the gateway device 100A. That is, the electronic device 10 and the gateway device 100A (for example, a router of Bluetooth or the like) are connected to each other for communication by the loose coupling short-range wireless communication. For example, the communication unit 30 of the electronic device 10 and the first communication unit 130A of the gateway device 100A in FIG. 2 transmit and receive information by the loose coupling short-range wireless communication.

In Bluetooth, for example, information is transmitted and received by the loose coupling short-range wireless communication before one-to-one communication connection is established by pairing. Then, when the second communication unit 140A of the gateway device 100A performs communication in conformity to, for example, a protocol (Ethernet and TCP/IP) of the Internet and the gateway device 100A and the computer communication network INT (the server 200) can be connected to each other for communication, the electronic device 10 and the computer communication network INT are directly connected to each other for communication via the gateway device 100A of the short-range wireless communication network BNT.

A display unit of the electronic device 10 visually informs the user that the user can stably use the Internet when information regarding connection of the gateway device 100A, that is, a state regarding whether connection is possible or connection is not possible, is displayed and the stable connection is made. When it is ascertained from positional information regarding the electronic device 10 that there is no connectable gateway device, it is possible to achieve low power consumption by performing no communication.

For example, in the comparative example of FIG. 3A, the electronic device WD is connected to the computer communication network INT via the information communication terminal SP. On the other hand, in the communication system 5 according to the embodiment, the electronic device 10 is directly connected to the gateway device 100A for communication by the loose coupling short-range wireless communication without passing though another information communication terminal SP to be connected to the computer communication network INT. Accordingly, even when the user does not carry the information communication terminal SP, the electronic device 10 can be directly connected to the computer communication network INT.

That is, the electronic device 10 can be connected to the computer communication network INT without depending on a charging state or the like of the information communication terminal SP. Then, it is possible to upload information regarding the electronic device 10 to the server 200 (SV) or download information from the server 200 to the electronic device 10. Accordingly, the electronic device 10 can be constantly connected to the computer communication network INT to transmit and receive information, and thus it is possible to improve constant connectivity of the electronic device 10.

The electronic device 10 includes, for example, the power generation unit 40 of solar power generation. The processing unit 20, the communication unit 30, and the like of the electronic device 10 operate with the power from the power generation unit 40. Accordingly, even when the electronic device 10 is not charged with an AC power supply or the like, the electronic device 10 can be operated with the power generated by the power generation unit 40. In this way, since it is not necessary to charge the electronic device 10 and it is not necessary for the user to detach the electronic device 10 for charging, it is possible to improve constant wearing properties of the electronic device 10.

In this way, the electronic device 10 and the gateway device 100A are connected to each other by the loose coupling short-range wireless communication in which power consumption is considerably less than power consumption by Wi-Fi or the like. Accordingly, the electronic device 10 can operate for a long time based on the power generated by the power generation unit 40, and thus it is possible to achieve an improvement in the constant wearing property.

According to the scheme of the embodiment, it is possible to considerably improve the constant connectivity and the constant wearing property of the electronic device 10. Accordingly, the electronic device 10 can constantly measure biological information or activity information (a pulse rate, consumption calories, an activity history, or the like) regarding the user, can acquire more appropriate lifelog information, and can supply information with a high added value to the user. Even when a natural disaster occurs, the user can be informed of disaster information using the electronic device 10 or a rescue action for a user can be performed using positional information or the like measured by the electronic device 10 without an influence of power failure or the like.

By ensuring constant connectivity or constant wearing properties of the electronic device 10, it is possible to easily perform a process of reporting maintenance information or the like based on surveillance information of the electronic device 10 to be described below or realize remote adjustment of a control target using the electronic device 10.

In the communication system 5 according to the embodiment, from the viewpoint of characteristics in which the electronic device 10 is not necessarily charged and can be constantly connected to the Internet, the user carrying the electronic device 10 can perform duplex communication with a headquarter directed by local government, police, army, or the like via the Internet in an emergency such as a natural disaster. That is, for example, even when a long-term power failure occurs in a limited area for a long time, the communication system 5 according to the embodiment can be utilized as a technology for an emergency response system that realizes victim search and rescue and evacuation guidance.

Here, the loose coupling short-range wireless communication used in the embodiment is, for example, communication performed during a scanning period (searching period) in which the gateway device 100A searches for a presence report packet from the electronic device 10.

Figure 4A:
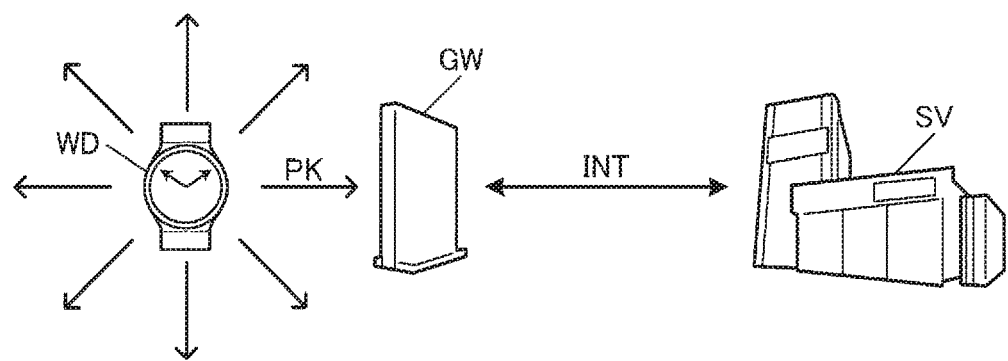
FIG. 4A is a diagram illustrating a communication scheme according to the embodiment.

For example, in FIG. 4A, the electronic device WD performs, for example, a process of transmitting a presence report packet PK for reporting presence of the electronic device WD to the periphery at each given period. The presence report packet PK is transmitted by the communication unit 30 in FIG. 2. On the other hand, the gateway device GW performs a scanning operation of searching for the electronic device WD in the periphery by capturing the presence report packet PK. The loose coupling short-range wireless communication according to the embodiment is communication performed during the scanning period.

That is, when the surrounding electronic device WD is found during the scanning period, connection establishment of the communication between the gateway device and the electronic device WD is normally realized. Then, after the connection establishment (pairing), one-to-one duplex communication between the gateway device and the electronic device WD starts.

The loose coupling short-range wireless communication according to the embodiment is moderate coupling communication performed during a scanning period before the connection establishment (pairing). For example, in the embodiment, as will be described with reference to FIGS. 8A to 8C to be described below, when the user wearing the electronic device WD moves, the constant connectivity is ensured by connecting the gateway device at a location corresponding to the position of the user to the electronic device WD. That is, depending on the position of the user, the gateway device which is a connection destination of the electronic device WD is switched one by one.

In this case, when communication between the electronic device WD and the gateway device is communication after the connection establishment (after the pairing), a process of cancelling the connection establishment with the gateway device of the source or a labor of the user may be necessary whenever the gateway device which is a connection destination is switched. For example, a case is assumed in which after the connection establishment (pairing) between the electronic device WD and a first gateway device, the user moves, and the electronic device WD is connected to a second gateway device which is a movement destination. In this case, a process of cancelling the connection establishment between the electronic device WD and the first gateway device or a user operation of cancelling the connection establishment may be necessary. Therefore, unnecessary power consumption for the process of cancelling the connection establishment may occur, low power consumption of the electronic device WD may be hindered, or convenience for the user may deteriorate.

From this viewpoint, since the loose coupling short-range wireless communication according to the embodiment is communication performed during the scanning period before such connection establishment, the process of cancelling the connection establishment or the labor of the user may be unnecessary. Low power consumption of the electronic device WD or an improvement in the convenience for the user is achieved. Since the transmission of the presence report packet is intermittent transmission, for example, there is the advantage that low power consumption can be further achieved through appropriate control of a transmission interval of the present report packet.

The electronic device WD in FIG. 4A transmits information to the gateway device GW using the present report packet PK. For example, by setting transmission information in a payload (see FIG. 7A) of the present report packet PK, the transmission information is transmitted to the gateway device GW. Alternatively, when the gateway device GW transmits a request packet (PKRQ) in response to the presence report packet PK (PKAD) as in FIG. 7B to be described below, the electronic device WD transmits information to the gateway device GW using a response packet (PKRS) of a request packet. For example, by setting the transmission information in a payload (see FIG. 7A) of the response packet, the transmission information is transmitted to the gateway device GW.

The transmission process is performed by the communication unit 30 in FIG. 2. Examples of information corresponding to the transmission information include authentication information (for example, a device address) for a process of authenticating the electronic device WD, measurement information of the electronic device (for example, biological information, positional information, motion information, an active amount information, or environmental information of temperature, atmospheric pressure, or humidity), operation state information of a device (a motor, a power generation unit, or the like) included in the electronic device, or information for remote adjustment of a control target.

The electronic device WD receives the information acquired based on the information transmitted to the computer communication network INT via the gateway device GW during the scanning period. That is, during the scanning period, the information is received from the computer communication network INT via the gateway device GW through the loose coupling short-range wireless communication. For example, during the scanning period in which the transmission information is transmitted to the gateway device GW, reception information which is information acquired based on the transmission information is received from the gateway device GW.

The reception process is performed by the communication unit 30 in FIG. 2. The reception information is information acquired in accordance with a result of the authentication process when the electronic device WD transmits information for an authentication process. Alternatively, when the measurement information of the electronic device WD or the operation state information of a device included in the electronic device WD is transmitted, the reception information is information acquired based on the measurement information or the operation state information. For example, the reception information is report information or information regarding a lifelog obtained when the server SV processes such information. When the information for remote adjustment of the control target is transmitted, the reception information is information acquired in accordance with a result of the remote adjustment.

The presence report packet and the scanning period are, for example, an advertising packet and an active scanning period in, for example, Bluetooth (Bluetooth low energy: a standard subsequent to Bluetooth 4.0), respectively. The advertising packet is a packet transmitted by an advertiser to find a device. A scanner finds an advertiser by capturing and receiving the advertising packet. The advertising packet is a packet that is transmitted in accordance with an advertising channel. In Bluetooth, there are passive scanning and active scanning. In the passive scanning, the scanner only receives an advertising packet.

On the other hand, in the active scanning, the scanner can further acquire information which is not entered in the advertising packet by transmitting a packet of scan_req. The short-range wireless communication according to the embodiment is not limited to the Bluetooth standard. Various standards such as the above-described ZigBee standard and Wi-SUN standard and standards developed from such standards can be assumed.

As will be described in FIGS. 8A to 8C to be described below, the electronic device WD performs the loose coupling short-range wireless communication with the first gateway device GW1 included in the short-range wireless communication network BNT during a first period. Then, during a second period different from the first period (the second period subsequent to the first period), the electronic device WD performs the loose coupling short-range wireless communication with the second gateway device GW2 included in the short-range wireless communication network BNT. For example, during the first period in which the electronic device WD is located near the first gateway device GW1, the electronic device WD performs the loose coupling short-range wireless communication with the first gateway device GW1.

During the second period in which the electronic device WD is located near the second gateway device GW2, the electronic device WD performs the loose coupling short-range wireless communication with the second gateway device GW2. That is, the gateway device which is a connection destination of the loose coupling short-range wireless communication is switched in order in accordance with the position of the electronic device WD. In this case, as illustrated in FIGS. 8A to 8C, when the electronic device WD is connected to the second gateway device GW2 for communication and a given deletion condition is established, the first gateway device GW1 performs a process of deleting the reception information from the electronic device WD or the transmission information (for example, information scheduled to be transmitted) to the electronic device WD.

The gateway device GW performs a process of converting address information of the electronic device WD received from the electronic device WD through the loose coupling short-range wireless communication into address information for the computer communication network. The conversion process is performed by the processing unit 120A in FIG. 2. Here, the address information of the electronic device WD is, for example, device address information such as a MAC address of the electronic device WD. As the device address information, for example, identification information (an identification number, a manufacturing number, or the like) of a communication semiconductor IC included in the communication unit 30 in FIG. 2 can be used. Alternatively, information in which given information is added to the identification information of the semiconductor IC may be device address information.

The address information for the computer communication network is identification information for uniquely specifying a device in the computer communication network INT. For example, when the computer communication network INT is the Internet, the address information for the computer communication network is an IP address. For example, the address information is an IP address defined in IPv6 of the Internet protocol. While about $2^{32}$ IP addresses can be used in IPv4, about $2^{128}$ IP addresses can be used in IPv6. The gateway device GW converts the device address (the MAC address) of the electronic device WD into, for example, an IP address in accordance with IPv6 when the protocol of Bluetooth is converted into the protocol of the Internet. By doing so, the electronic device WD can be identified as a unique device on the Internet.

As illustrated in FIG. 4A, the electronic device WD is directly connected to the gateway device GW for communication through the loose coupling short-range wireless communication without passing through another information communication terminal SP. That is, the electronic device WD is directly connected to the gateway device GW for communication without passing through the information communication terminal SP such as a smartphone, a tablet PC, a mobile phone, or a notebook PC. In this way, for example, even when the user does not carry the information communication terminal SP or the charge of the information communication terminal SP runs out, the electronic device WD can be directly connected to the computer communication network INT, and thus an improvement in constant connectivity is achieved. By directly connecting the electronic device WD to the gateway device GW through the loose coupling short-range wireless communication, power consumption can be considerably reduced compared to a case in which the connection is made by Wi-Fi or the like. Thus, it is possible to improve constant connectivity or constant wearing properties.

Figure 4B:
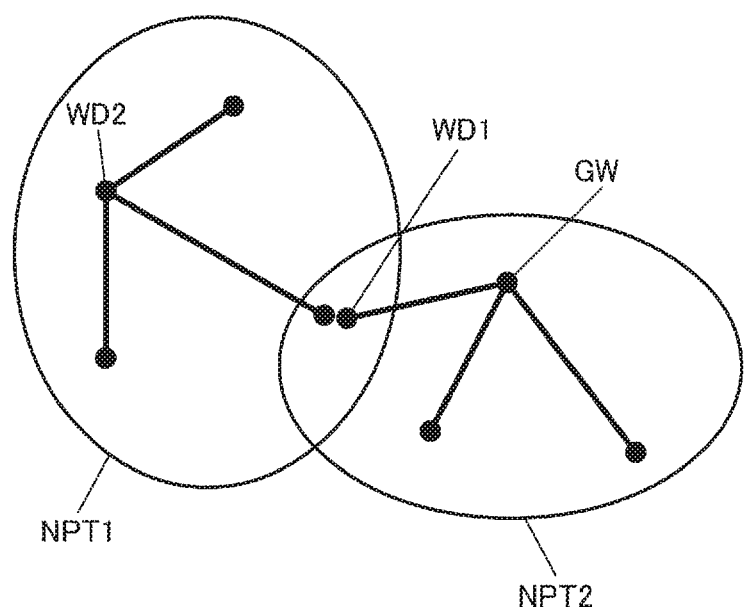
FIG. 4B is a diagram illustrating a communication scheme according to the embodiment.

The communication system 5 according to the embodiment may include the second electronic device WD2 connected to the electronic device WD1 for communication, as illustrated in FIG. 4B. In this case, the second electronic device WD2 is connected to the computer communication network INT for communication via the electronic device WD1 and the gateway device GW through the loose coupling short-range wireless communication.

For example, FIG. 4B illustrates an example of piconets in conformity to Bluetooth, and a piconet NPT1 (in a broad sense, a first network) and a piconet NPT2 (in a broad sense, a second network) are formed. In the piconet NPT1, the electronic device WD2 serves as an advertiser and the electronic device WD1 serves as a scanner. When the electronic device WD2 serving as an advertiser transmits an advertising packet (in a broad sense, a presence report packet) and the electronic device WD1 serving as the scanner receives the advertising packet during an active scanning period (in a broad sense, a scanning period), the loose coupling short-range wireless communication is realized between the devices.

On the other hand, in the piconet NPT2, the electronic device WD1 serves as an advertiser and the gateway device GW serves as the scanner. When the electronic device WD1 serving as the advertiser transmits an advertising packet and the gateway device GW serving as the scanner receives the advertising packet during an active scanning period, the loose coupling short-range wireless communication is realized between the devices.

For example, in the loose coupling short-range wireless communication in the piconet NPT1, the transmission information transmitted to the electronic device WD1 by the electronic device WD2 is retained in the storage unit 50 by the electronic device WD1. Then, in the loose coupling short-range wireless communication in the piconet NPT2, the electronic device WD1 may read the transmission information retained in the storage unit 50 and transmit the transmission information to the gateway device GW. In the loose coupling short-range wireless communication in the piconet NPT2, the reception information received from the gateway device GW by the electronic device WD1 is retained in the storage unit 50 by the electronic device WD1. Then, in the loose coupling short-range wireless communication in the piconet NPT1, the electronic device WD1 may read the reception information retained in the storage unit 50 and transmit the reception information to the electronic device WD2.

Figure 9A:
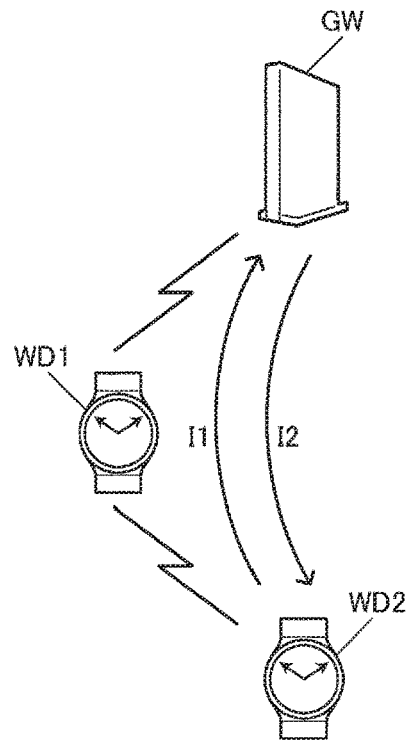
FIG. 9A is a diagram illustrating a scheme of performing communication via another electronic device.
Figure 9B:
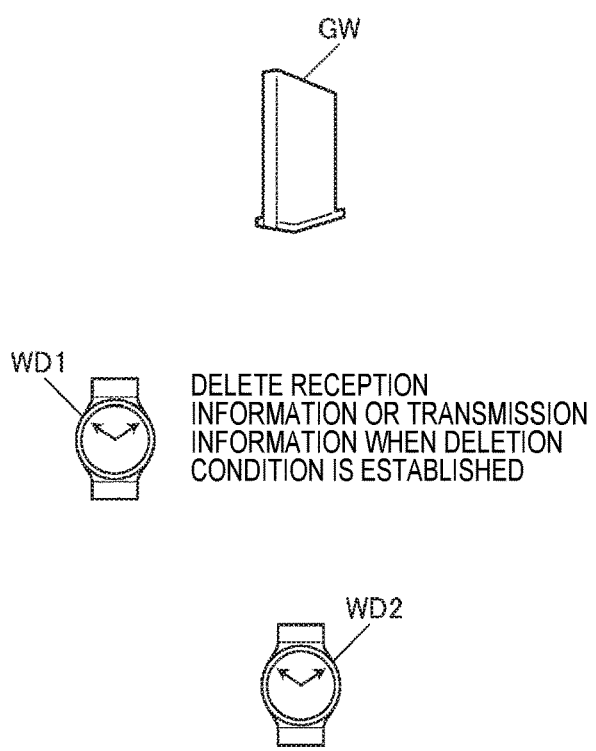
FIG. 9B is a diagram illustrating deletion of transmission information.

As illustrated in FIGS. 9A and 9B to be described below, the electronic device WD1 preferably performs a process of deleting the reception information from the second electronic device WD2 or the transmission information to the second electronic device WD2 when a given deletion condition is established. In the loose coupling short-range wireless communication between the electronic device WD and the gateway device GW, connection or non-connection may be set based on input information from the user. In this way, the setting of the non-connection by the user as unnecessary leads to saving of the power consumption.

In the embodiment, information communicated through the loose coupling short-range wireless communication can include at least one of time information and biological information of the user wearing the electronic device WD. For example, the biological information of the user is acquired using the sensor unit 54 in FIG. 2. Alternatively, when the electronic device WD is a watch or the like, counted time information is acquired. Then, the biological information or the time information is transmitted to the gateway device 100A through the loose coupling short-range wireless communication. Thus, the biological information or the time information can be uploaded to the server 200 via the gateway device 100A and the computer communication network INT. As a result, for example, when the processing unit 220 of the server 200 performs various kinds of information processing, lifelog information or the like based on the biological information or the like of the user can be generated.

3. Loose Coupling Short-Range Wireless Communication

Figure 5:
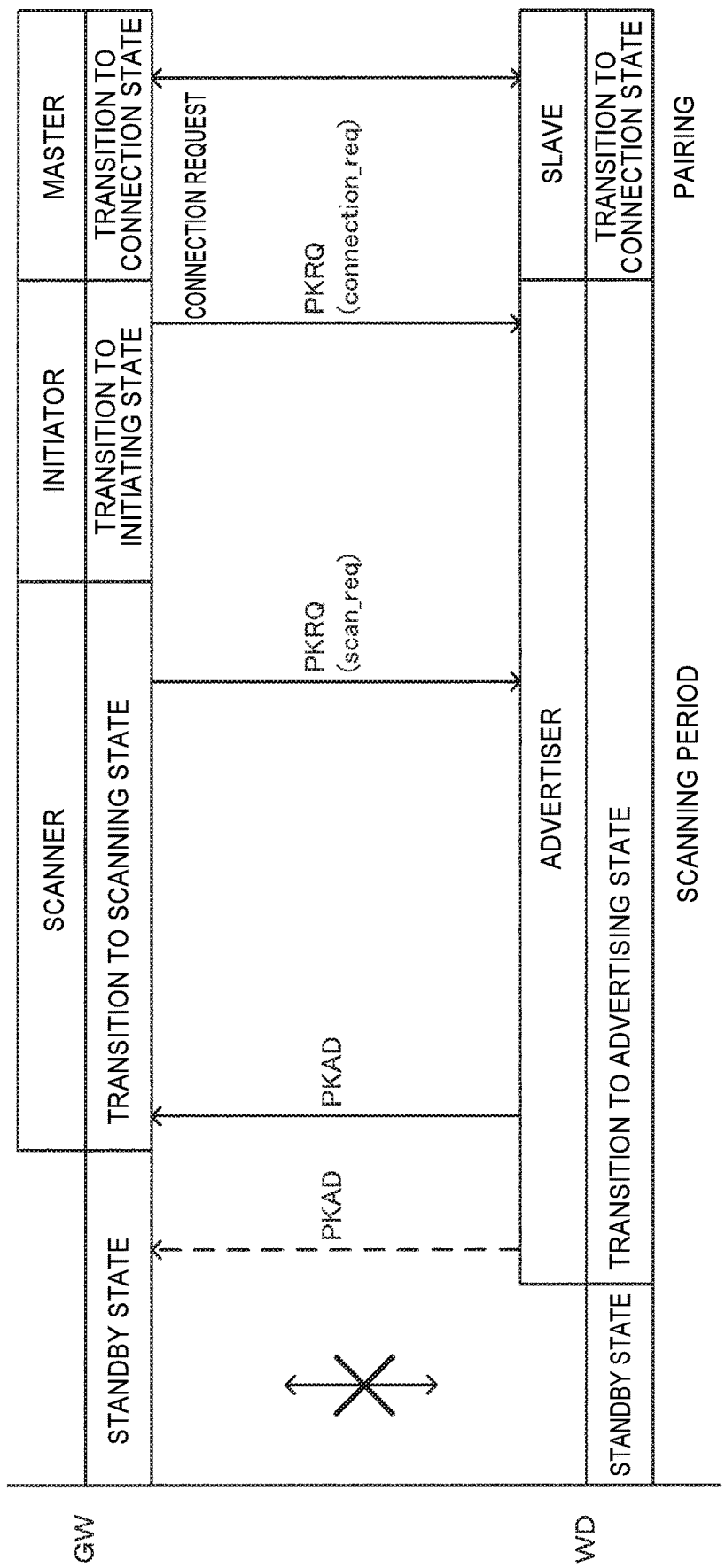
FIG. 5 is a diagram illustrating a communication sequence from standby to pairing.

Next, the details of the loose coupling short-range wireless communication will be described. FIG. 5 is a diagram illustrating a communication sequence from standby to pairing in Bluetooth.

First, both the electronic device WD and the gateway device GW are in a standby state. In the standby state, transmission and reception are not performed between both the electronic device WD and the gateway device GW.

Subsequently, the electronic device WD transitions to the advertising state and transmits an advertising packet PKAD for each regular period as an advertiser (broadcaster). The advertising packet PKAD is a packet used for the electronic device WD serving as the advertiser to report presence of the electronic device WD to the periphery. As a transmission interval of the advertising packet PKAD is shorter, the electronic device WD is found more easily. However, when the transmission interval is shortened, power consumption in communication may increase.

When the advertising packet PKAD is received, the gateway device GW transitions to the scanning state. Reception of the advertising packet PKAD by the gateway device GW serving as a scanner (observer) is passing scan. On the other hand, in the active scanning illustrated in FIG. 5, the scanner receives the advertising packet PKAD, subsequently transmits a request packet PKRQ (scan_req), and further acquires information from the advertiser.

The gateway device GW determines a connection destination based on information obtained through the scanning. Then, the gateway device GW transitions to an initiating state and transmits a request packet PKRQ (connection_req) for a connection request to the electronic device WD which is the connection destination. Thus, the gateway device GW and the electronic device WD transition to a connection state, the gateway device GW serves as a master, and the electronic device WD serves as a slave. Then, connection between the gateway device Gw and the electronic device WD is established, and thus pairing is realized.

By performing the pairing in this way, one-to-one duplex communication is performed between the master and the slave. A predetermined process is necessary to cancel the pairing. In Bluetooth, reconnection after pairing is defined.

As illustrated in FIG. 5, in duplex communication by Bluetooth, pairing is assumed to be performed. However, when the pairing is performed and the duplex communication is performed between the gateway device and the electronic device, there is the problem of low power consumption or constant connectivity. For example, when the process of switching the gateway device which is a connection destination of the electronic device WD in order, as in FIGS. 8A to 8C to be described below, a user operation, a process of cancelling pairing or reconnection, or the like may be necessary, it may take much time to perform timeout for transition to the cancelling of the pairing, power may be unnecessarily consumed, or convenience for the user may deteriorate. Therefore, it is difficult to establish constant connection between the gateway device and the electronic device.

Accordingly, in the embodiment, communication connection between the electronic device and the gateway device is realized through the loose coupling short-range wireless communication. The loose coupling short-range wireless communication is communication performed during a scanning period which is a state in which no pairing is performed. The scanning period is a period before the request (connection_req) for the connection establishment (connection establishment of one-to-one duplex communication) in FIG. 5 is made.

Figure 6:
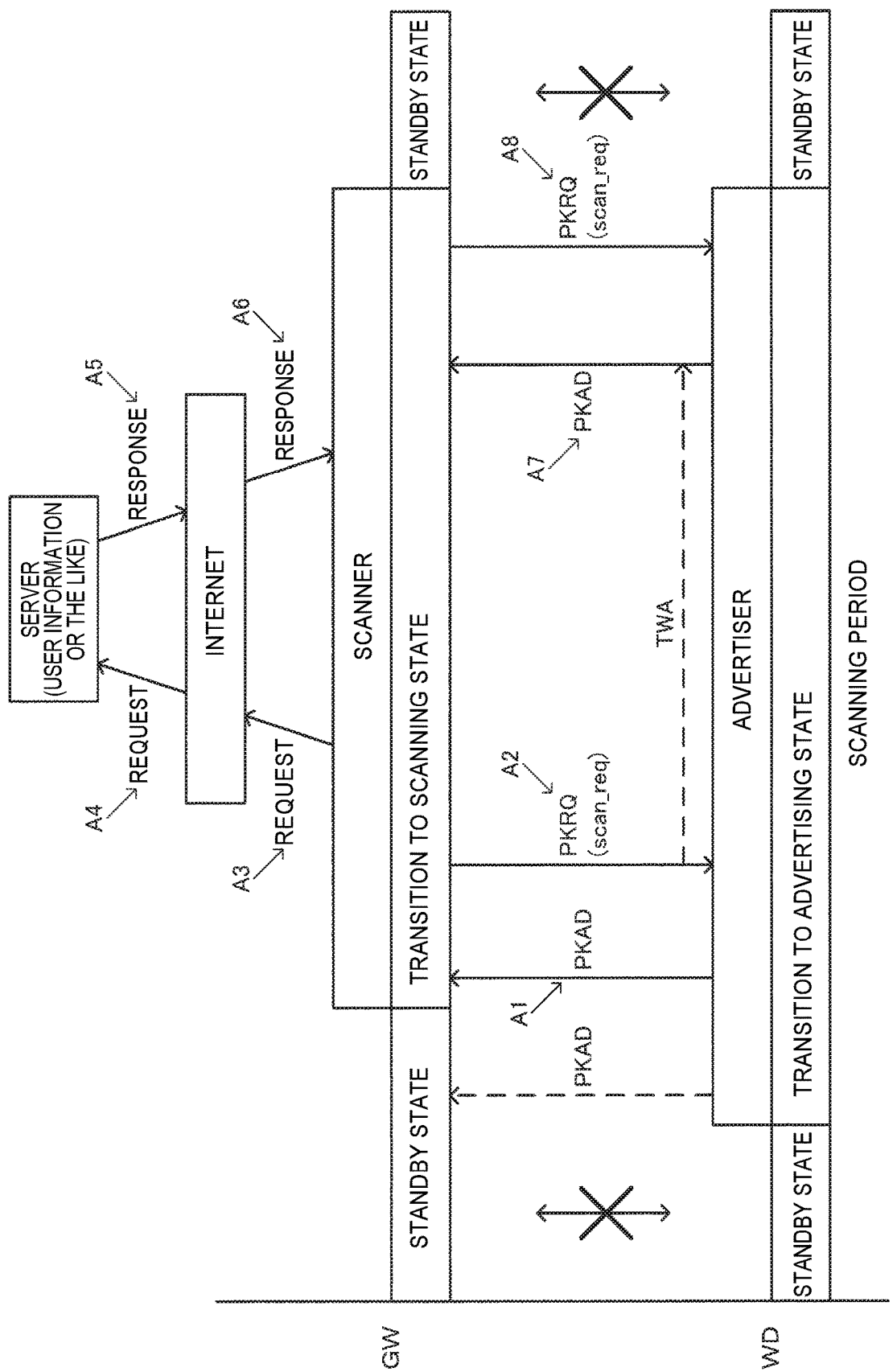
FIG. 6 is a diagram illustrating a communication sequence of short-range wireless communication of loose coupling according to the embodiment.

FIG. 6 is a diagram illustrating a communication sequence of the loose coupling short-range wireless communication according to the embodiment. As illustrated in FIG. 6, first, both the electronic device WD and the gateway device GW are in the standby state. Subsequently, the electronic device WD that has transitioned to the advertising state transmits the advertising packet PKAD. When the gateway device GW receives the advertising packet PKAD, the gateway device GW transitions to the scanning state.

In this case, the electronic device WD can transmit information to the gateway device GW using the advertising packet PKAD (presence report packet) indicated by A1 of FIG. 6. For example, authentication information such as device address information can be transmitted. The gateway device GW can further acquire information from the electronic device WD, for example, by transmitting the request packet PKRQ (scan_req) indicated by A2 in the active scanning. For example, the gateway device GW can acquire information which is not completely settled in the advertising packet PKAD indicated by A1. The gateway device GW can set, for example, the length of a period TWA for determining a timing at which the electronic device WD subsequently transmits the advertising packet PKAD using the request packet PKRQ indicated by A2. In this way, the transmission interval of the advertising packet PKAD transmitted from the electronic device WD can be controlled optimally, and it is possible to achieve further low power consumption.

The gateway device GW receiving the authentication information or the like from the electronic device WD transmits a request for acquiring various kinds of information such as user information on a server to the server via the Internet (in a broad sense, a computer communication network), as indicated by A3 and A4 in FIG. 6. In this case, the gateway device GW performs protocol conversion from Bluetooth to the Internet. For example, the gateway device GW performs a process of converting a device address (MAC address) which is the authentication information received from the electronic device WD into an IP address (IPv6) of the Internet. For example, in a standard subsequent to Bluetooth 4.1, IP addresses of IPv6 are supported. By doing so, the electronic device WD on the Internet can be uniquely specified, and thus it is possible to specify various kinds of information such as user information associated with the IP address (the device address) in a storage unit (database) of the server.

In this way, the server responds to the gateway device GW with the various kinds of specified information such as the user information as a response via the Internet, as indicated by A5 and A6 of FIG. 6. Then, for example, after the period TWA elapses, as indicated by A7, the electronic device WD is assumed to transmit the advertising packet PKAD. In this case, the gateway device GW transmits various kinds of information such as the user information acquired from the server to the electronic device WD using, for example, a request packet PKRQ (scan_req) indicated by A8. For example, the information such as the user information is set in a payload of the request packet PKRQ to be transmitted. By doing so, the electronic device WD can acquire various kinds of information from the server.

The length of the period TWA is set in consideration of a length of a time from transmission of the request (A3 or A4) to the server to transmission of the response (A5 or A6) from the server. When a response from the server has not yet arrived at the gateway device GW at a timing at which the electronic device WD transmits the advertising packet PKAD after elapse of the period TWA, as indicated by A7, the electronic device WD may transmit the advertising packet PKAD again after a predetermined period.

In this way, by using the loose coupling short-range wireless communication of FIG. 6, it is possible to realize loose coupling duplex communication between the electronic device WD and the gateway device GW without performing the pairing as in FIG. 5. Then, in the loose coupling duplex communication, a process of canceling pairing, a process performed at the time of timeout in transition to the pairing cancellation, or a labor is not necessary. Therefore, it is possible to achieve low power consumption and improve convenience for the user. For example, by optimally setting the length of the period TWA of FIG. 6, it is possible to also realize further low power consumption. Accordingly, it is possible to realize the optimum communication scheme, for example, in the electronic device WD that operates while maintaining constant connectivity or constant wearing properties without charging based on power form the power generation unit 40.

In the comparative example in which the beacon illustrated in FIG. 3B is used, the communication module CM transmitting the beacon may not be connected to the server SV via the Internet to acquire information regarding the server SV. That is, the information regarding the server SV is acquired when the information communication terminal SP is connected to the Internet.

In the scheme of using the loose coupling short-range wireless communication according to the embodiment, however, as illustrated in FIG. 6, the electronic device WD can be directly connected to the gateway device GW for communication without passing through the information communication terminal SP to acquire information from the server or the like via the Internet. Accordingly, it is possible to realize the communication scheme optimum for constant connection or constant wearing of the electronic device WD.

In the specification of Bluetooth, an upper limit is set in the number of devices which can be connected by pairing at once in some cases. Thus, when pairing is performed, the number of connections reaches the upper limit. However, according to the loose coupling scheme, the number of connections can be greater than the upper limit.

The duplex communication scheme between the electronic device WD and the gateway device GW is not limited to the above-described scheme, but various modifications can be made. For example, when a data amount of the transmission information of the electronic device WD is large, for example, the gateway device GW transmits a request packet PKRQ a plurality of times and the electronic device WD transmits a response packet PKRS (see FIG. 7B) corresponding to the response packet PKRQ a plurality of times, so that the transmission information can be transmitted. For example, measurement information (surveillance information) of the electronic device WD is preferably transmitted in accordance with such a transmission scheme.

The reception information received from the gateway device GW by the electronic device WD can also be received in accordance with the same scheme as the above-described transmission scheme. The duplex communication between the electronic device WD and the gateway device GW may be performed using different types of packets from the advertising packet PKAD, the request packet PKRQ, and the response packet PKRS. For example, the duplex communication scheme according to the embodiment can be realized in accordance with the standard of Bluetooth 4.1 or 4.2, but the duplex communication scheme (the loose coupling short-range wireless communication) according to the embodiment may be realized using types of packets defined in a standard developed from the standard (for example, a standard subsequent to 4.3).

Figure 7A:
FIG. 7A is a diagram illustrating a packet format.

FIG. 7A illustrates a packet format of Bluetooth. A packet includes an access address, a protocol data unit PDU, and an error detection cyclic redundancy check CRC. A preamble of the head of the packet is used for synchronization of a reading timing of bits (0/1) and the strength of a signal.

The access address is a random value allocated at each connection between two devices and is an identifier for identifying connection in which a packet is transmitted. For example, advertising communication is performed using three channels of Bluetooth, but the access address is set as a fixed value. The advertising packet is transmitted at each advertising event of a regular period. The advertising period can be set, for example, from 20 msec to 10.25 sec.

The PDU is data transmitted and received by an upper layer and includes a header and a payload. For example, a type of packet (scan_req, scan_res, connection_req, or the like) can be set in the header of the PDU.

Data by an upper layer can be set in the payload of the PDU. For example, the payload of the advertising packet includes a public device address. The public device address may be used to set a device address of an electronic device.

Figure 7B:
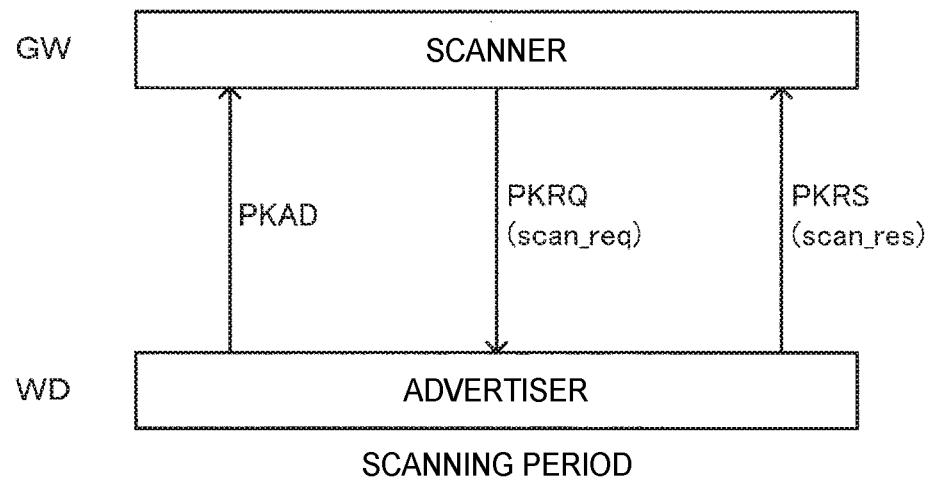
FIG. 7B is a diagram illustrating a request packet and a response packet.

In the embodiment, as illustrated in FIG. 7B, the electronic device WD can transmit the transmission information to the gateway device GW using the advertising packet PKAD (the presence report packet). For example, the transmission information is set in the payload of the PDU in FIG. 7A to be transmitted. As illustrated in FIG. 7B, the gateway device GW is assumed to transmit the request packet PKRQ in response to the advertising packet PKAD from the electronic device WD. In the header of the request packet PKRQ, scan_req is set as the above-described type of packet.

In this case, the electronic device WD may transmit the transmission information to the gateway device GW using the response packet PKRS of the request packet PKRQ. For example, information (for example, measurement information or surveillance information) which is not included in the advertising packet PKAD is transmitted using the response packet PKRS. In the header of the response packet PKRS, scan_res is set as the above-described type of packet. For example, the gateway device GW can transmit information acquired from the Internet (the server) to the electronic device WD using the request packet PKRQ in FIG. 7B. The advertising packet PKAD, the request packet PKRQ, and the response packet PKRS have the same packet format as the format illustrated in FIG. 7A.

In the embodiment, the electronic device WD is connected by switching the gateway device which is a connection destination in order in accordance with its position or the like. For example, in FIG. 8A (first period), the electronic device WD transmits and receives information by performing the loose coupling short-range wireless communication illustrated in FIG. 6 with the gateway device GW1.

Figure 8A:
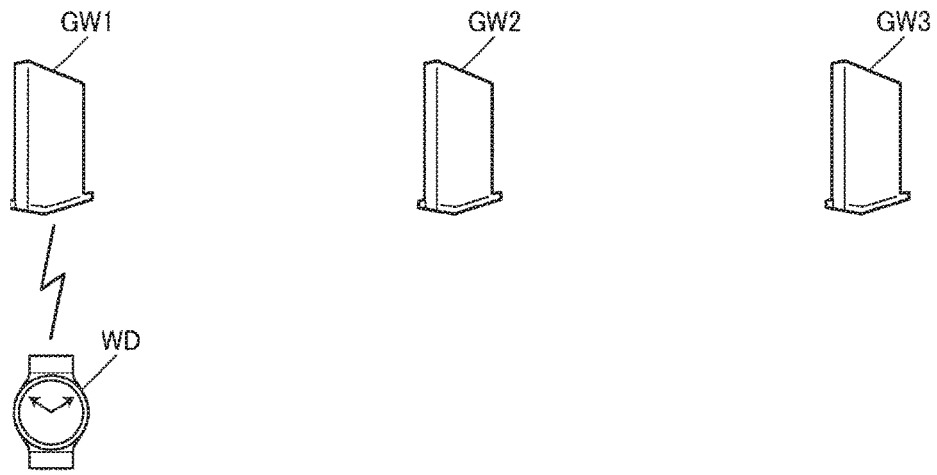
FIG. 8A is a diagram illustrating a scheme of sequentially switching a gateway device serving as a connection destination of an electronic device for communication.
Figure 8B:
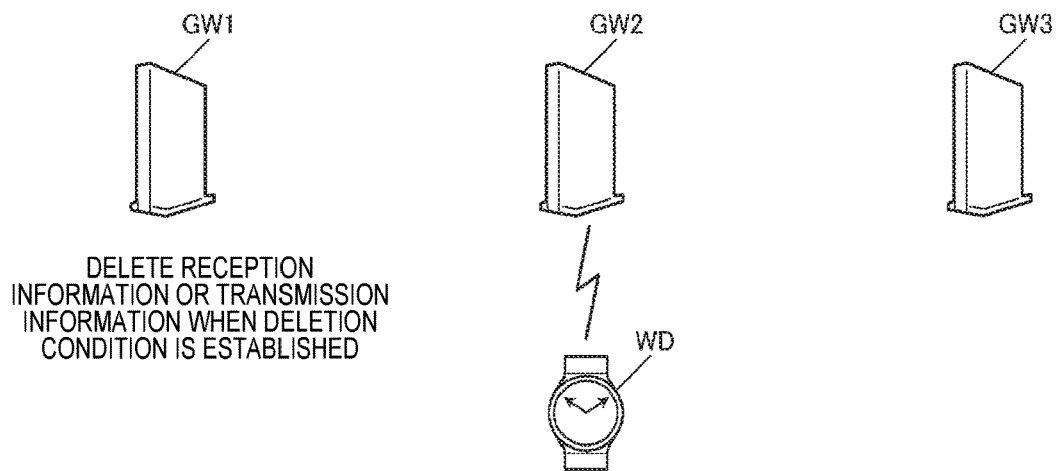
FIG. 8B is a diagram illustrating a scheme of sequentially switching a gateway device serving as a connection destination of an electronic device for communication.

Then, as illustrated in FIG. 8B (second period), it is assumed that the user wearing the electronic device WD moves, the gateway device GW1 does not enter a range of a communication distance, and the gateway device GW2 enters the range of the communication distance. The range of the communication distance (a range of a maximum communicable distance) is a range of, for example, about 50 m to 100 m in the case of Bluetooth and is a range of, for example, about 100 m to 1 km in the case of sub-giga communication such as Wi-SUN. In this case, the electronic device WD transmits and receives information by performing the loose coupling short-range wireless communication with the gateway device GW2.

Figure 8C:
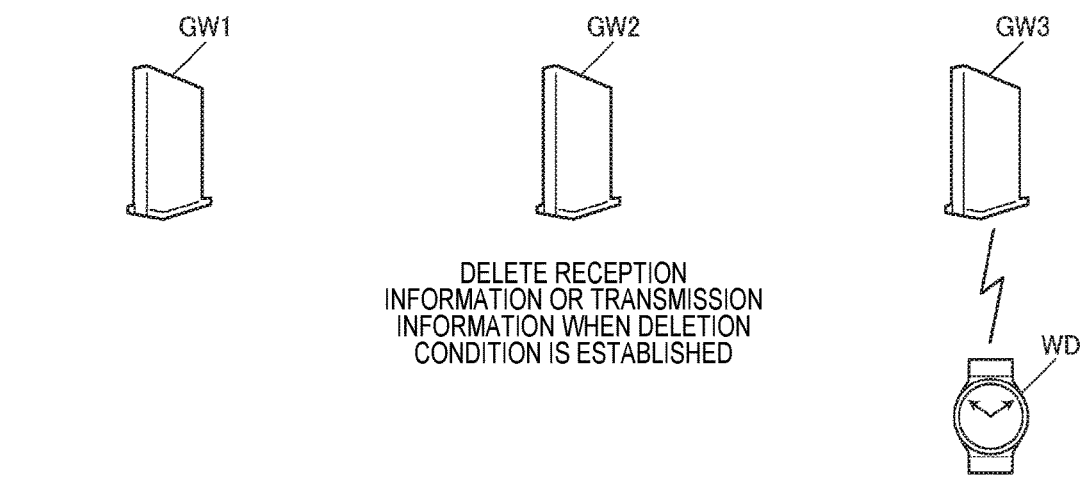
FIG. 8C is a diagram illustrating a scheme of sequentially switching a gateway device serving as a connection destination of an electronic device for communication.

As illustrated in FIG. 8C (third period), when the user moves, the gateway device GW2 does not enter the range of the communication distance, and the gateway device GW3 enters the range of the communication distance, the electronic device WD transmits and receives information by performing the loose coupling short-range wireless communication with the gateway device GW3.

In this way, in the embodiment, as illustrated in FIGS. 8A to 8C, the electronic device WD switches the gateway device which is a connection destination in order in accordance with its position or the like and performs the loose coupling short-range wireless communication. Then, in any case of FIGS. 8A to 8C, the electronic device WD can connect the Internet via the gateway device to upload various kinds of information to the Internet (the server) or download information from the Internet. Accordingly, it is possible to realize constant connection with the Internet. In the loose coupling short-range wireless communication, a process of canceling pairing, a process performed at the time of timeout in transition to the pairing cancellation, or a labor is not necessary. Therefore, it is possible to prevent unnecessary power consumption. Accordingly, it is possible to realize constant connection with the Internet while operating the electronic device WD with only power generated through solar power generation or the like by the power generation unit 40.

As illustrated in FIG. 8B, when the electronic device WD is connected to the gateway device GW2 for communication and a deletion condition is established, the gateway device GW1 preferably performs a process of deleting the reception information from the electronic device WD or the transmission information to the electronic device WD. For example, when the reception information received from the electronic device WD by the gateway device GW1 or the transmission information transmitted to the electronic device WD in FIG. 8A is retained in the storage unit of the gateway device GW1, the reception information or the transmission information is deleted.

Similarly, as illustrated in FIG. 8C, when the electronic device WD is connected to the gateway device GW3 for communication and a deletion condition is established, the gateway device GW2 preferably performs a process of deleting the reception information from the electronic device WD or the transmission information to the electronic device WD. For example, when the reception information received from the electronic device WD by the gateway device GW2 or the transmission information transmitted to the electronic device WD in FIG. 8B is retained in the storage unit of the gateway device GW2, the reception information or the transmission information is deleted.

Here, the deletion condition can be determined based on, for example, elapse of a time. For example, when the state of FIG. 8A transitions to the state of FIG. 8B and a packet from the electronic device WD may not be received by the gateway device GW1, measurement of a time starts. When a predetermined time elapses, the reception information or the transmission information is deleted. Alternatively, the gateway device GW1 is notified via, for example, the Internet that the electronic device WD is connected to the gateway device GW2, as illustrated in FIG. 8B, the reception information or the transmission information stored in the storage unit of the gateway device GW1 may be deleted.

In FIG. 6, it is assumed that the gateway device GW1 and the electronic device WD are distant from each other and are outside of the range of the communication distance before the response (A5 or A6) is made in response to the request (A3 or A4) transmitted to the Internet. In this case, the gateway device GW1 may perform the process of deleting the transmission information scheduled to be transmitted to the electronic device WD.

When the process of deleting the reception information or the transmission information is performed, it is possible to prevent a situation in which unnecessary information is retained in the storage unit of the gateway device and the use storage capacity of the storage unit is constricted. By deleting the reception information or the transmission information relating the unconnected electronic device, it is possible to improve security of the information.

In the embodiment, as illustrated in FIG. 9A, the electronic device WD2 may be connected to the Internet (the computer communication network) for communication via the other electronic device WD1 and the gateway device GW through the loose coupling short-range wireless communication. For example, the electronic device WD2 transmits information I1 to the gateway device GW or receives information I2 from the gateway device GW through the loose coupling short-range wireless communication between the electronic devices WD1 and WD2 and the loose coupling short-range wireless communication between the electronic device WD1 and the gateway device GW. The information I1 is uploaded to the Internet by the gateway device GW.

The information I2 is information downloaded to the gateway device GW from the Internet. The transmission and reception of the information via another electronic device can be realized through communication of the piconet or the like described with reference to FIG. 4B in the case of Bluetooth.

In this case, as illustrated in FIG. 9B, when the deletion condition is established, the electronic device WD1 preferably performs the process of deleting the reception information from the electronic device WD2 or the transmission information to the electronic device WD2.

For example, in FIG. 9A, a case in which the electronic device WD1 receives the information I1 from the electronic device WD2 and transmits the received information I1 to the gateway device GW is assumed. In this case, the electronic device WD1 temporarily retains the information I1 received through the loose coupling short-range wireless communication with the electronic device WD2 in the storage unit.

Thereafter, the information I1 retained in the storage unit is transmitted through the loose coupling short-range wireless communication with the gateway device GW. In this case, as illustrated in FIG. 9B, the electronic device WD1 performs the process of deleting the information I1 temporarily stored in the storage unit.

In FIG. 9A, a case in which the electronic device WD1 receives the information I2 from the gateway device GW and transmits the received information I2 to the electronic device WD2 is assumed. In this case, the electronic device WD1 temporarily retains the information I2 received through the loose coupling short-range wireless communication with the gateway device GW in the storage unit. Thereafter, the information I2 retained in the storage unit is transmitted through the loose coupling short-range wireless communication with the electronic device WD2. In this case, as illustrated in FIG. 9B, the electronic device WD1 performs the process of deleting the information I2 temporarily stored in the storage unit.

In this case, the deletion condition may be determined in accordance with, for example, elapse of a time. For example, in FIG. 9A, the electronic device WD1 deletes the information I1 when a given time elapses after the transmission of the information I1 to the gateway device GW. Alternatively, the information I1 may be deleted immediately after the transmission of the information I1. When a given time elapses after the transmission of the information I2 to the electronic device WD2, the electronic device WD1 deletes the information I2. Alternatively, the information I2 may be deleted immediately after the transmission of the information I2.

When the electronic device WD2 transmits the information I1 through the other electronic device WD1 as in FIG. 9A, a process of encrypting the information I1 is performed to ensure security. A process of encrypting the information I2 is also performed.

4. Transmission Example by Multi-Hop Communication

Next, an example of transmission and reception of information through multi-hop communication configured with Bluetooth as the short-range wireless communication network BNT will be described with reference to FIGS. 10 and 11.

Figure 10:
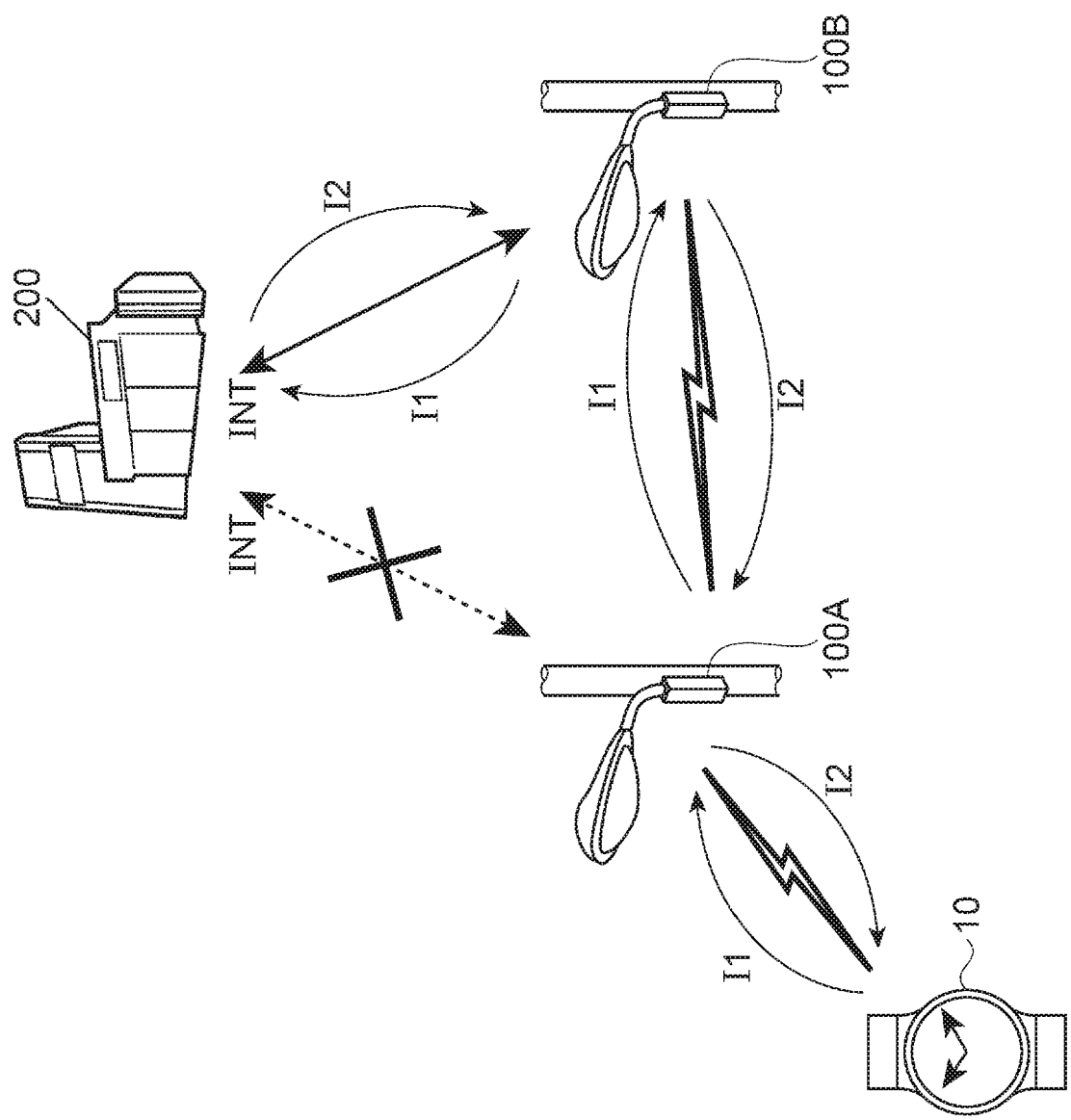
FIG. 10 is a diagram illustrating communication connection between an electronic device and a server.

As illustrated in FIG. 10, a case in which the electronic device 10 is connected to the computer communication network INT for communication via the gateway device 100A is first assumed. When the electronic device 10 can be connected to the gateway device 100A for communication through the loose coupling short-range wireless communication and the gateway device 100A can be connected (communicable) to the computer communication network INT for communication, the processing unit 120A of the gateway device 100A controls the first communication unit 130A such that the first communication unit 130A is able to communicate with the communication unit 30 of the electronic device 10 and further control the second communication unit 140A such that the second communication unit 140A is able to communicate with the computer communication network INT. Thus, the electronic device 10 can transmit the information I1 to the server 200 or can receive the information I2 from the server 200.

Here, a case is assumed in which the electronic device 10 can be connected to the gateway device 100A for communication through the loose coupling short-range wireless communication, but the gateway device 100A may not be connected (incommunicable) to the computer communication network INT due to power failure, breakdown, or the like and on the other hand, the gateway device 100A can be connected to the gateway device 100B for communication through the loose coupling short-range wireless communication and the gateway device 100B can be connected to the computer communication network INT for communication. In FIG. 10, the gateway device 100B is equivalent to the second gateway device.

In this case, the processing unit 120A of the gateway device 100A controls the first communication unit 130A such that the first communication unit 130A is able to communicate with the communication unit 30 of the electronic device 10 and further controls the third communication unit 135A such that the third communication unit 135A is able to communicate with the third communication unit 135B of the gateway device 100B. Then, the processing unit 120B of the gateway device 100B controls the second communication unit 140B such that the second communication unit 140B is able to communicate with the computer communication network INT (the server 200). Thus, the communication unit 30 of the electronic device 10 is connected to the computer communication network INT to be communicable to each other via the gateway device 100A and the gateway device 100B. As a result, the electronic device 10 can transmit the information I1 to the server 200 or receive the information I2 from the server 200.

Figure 11:
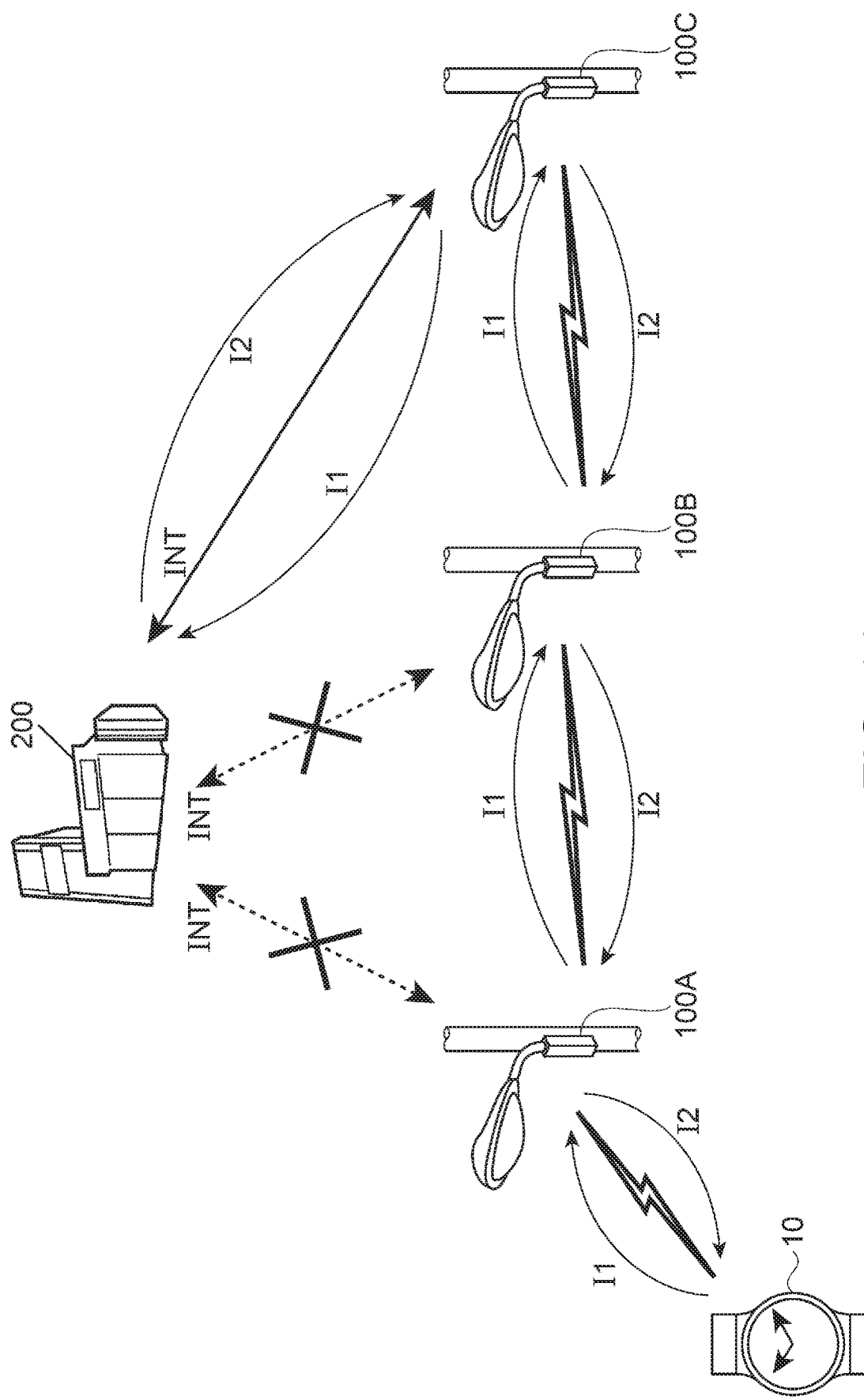
FIG. 11 is a diagram illustrating communication connection between the electronic device and the server.

Next, as illustrated in FIG. 11, a case is assumed in which the electronic device 10 can be connected to the gateway device 100A for communication through the loose coupling short-range wireless communication, and the gateway device 100A and the gateway device 100B may not be connected to the computer communication network INT due to power failure, breakdown, or the like, the gateway device 100B can be connected to the gateway device 100A and the gateway device 100C near the gateway device 100B for communication through the loose coupling short-range wireless communication, and the gateway device 100C can be connected to the computer communication network INT for communication. In FIG. 11, the gateway device 100C is equivalent to the second gateway device and the gateway device 100A is equivalent to the third gateway device.

In this case, the processing unit 120A of the gateway device 100A controls the first communication unit 130A such that the first communication unit 130A is able to communicate with the communication unit 30 of the electronic device 10 and further controls the third communication unit 135A such that the third communication unit 135A is able to communicate with the third communication unit 135B of the gateway device 100B. Then, the processing unit 120B of the gateway device 100B controls the third communication unit 135B such that the third communication unit 135B is able to communicate with the third communication unit (not illustrated) of the gateway device 100C. Further, the processing unit (not illustrated) of the gateway device 100C controls the second communication unit (not illustrated) such that the second communication unit is able to communicate with the computer communication network INT (the server 200). Thus, the communication unit 30 of the electronic device 10 is connected to the computer communication network INT to be communicable via the gateway device 100A, the gateway device 100B, and the gateway device 100C. As a result, the electronic device 10 can transmit the information I1 to the server 200 or receive the information I2 from the server 200.

Figure 12:
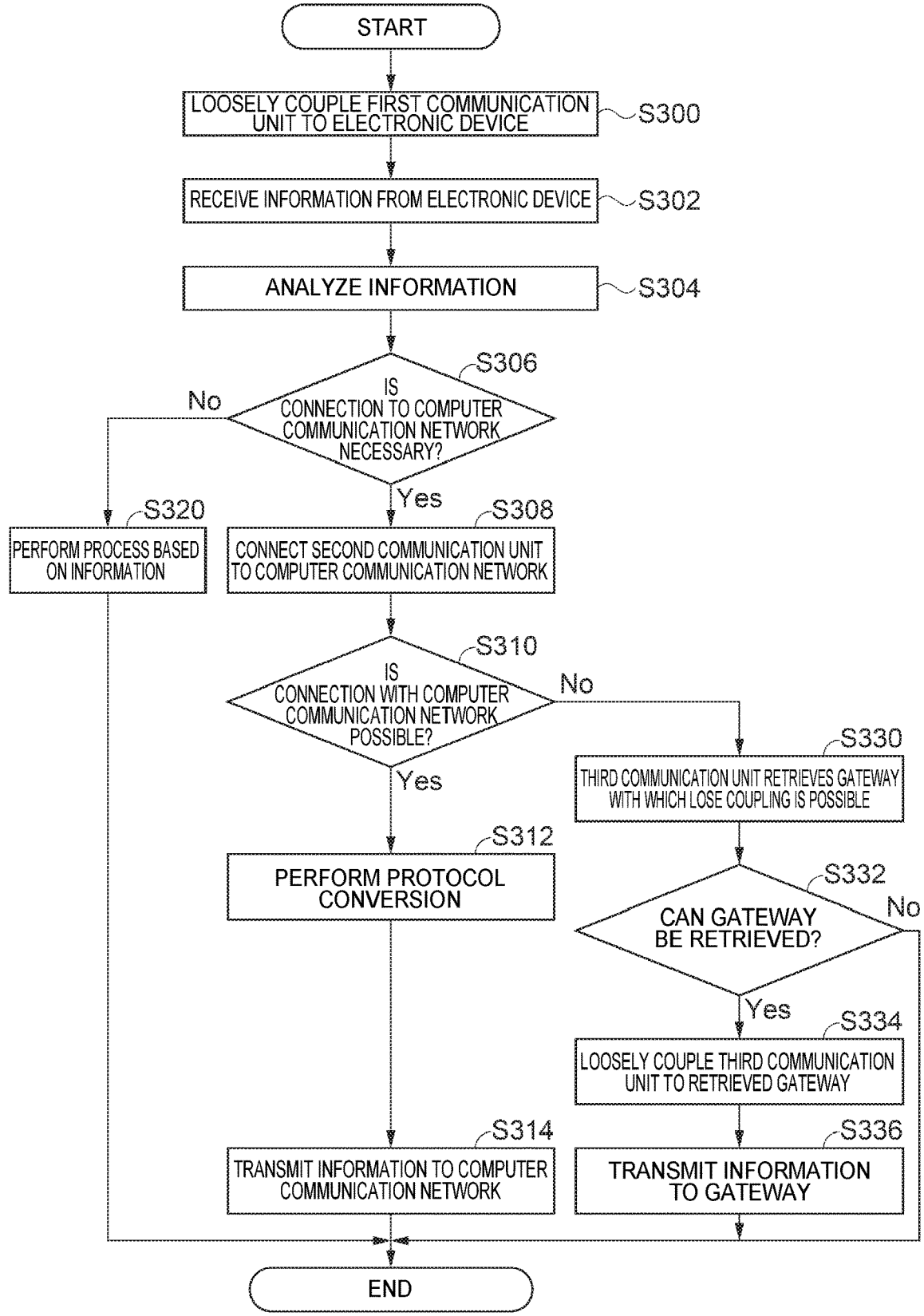
FIG. 12 is a flowchart illustrating a flow of a process of a gateway device.

FIG. 12 is a flowchart illustrating a flow of a process performed when the gateway device 100A receives the advertising packet PKAD from the electronic device 10 transitioning to the advertising state.

First, the gateway device 100A is loosely coupled with the electronic device 10 that has transmitted the adverting packet PKAD (step S300).

Subsequently, the gateway device 100A receives information from the electronic device 10 (step S302). The gateway device 100A stores the received information.

Subsequently, the gateway device 100A analyzes the received information (step S304) and determines whether connection to the computer communication network INT is necessary (step S306).

Here, when the gateway device 100A determines that the connection to the computer communication network INT is necessary (Yes in step S306), the gateway device 100A is connected to the computer communication network INT (step S308).

Subsequently, the gateway device 100A determines whether the connection with the computer communication network INT is made (step S310).

Here, when the gateway device 100A determines that the connection with the computer communication network INT is not made (No in step S310), the third communication unit 135A of the gateway device 100A transitions to the advertising state and retrieves another gateway devices 100 with which loose coupling is possible (step S330).

Subsequently, the gateway device 100A determines whether the other gateway device 100 is found (step S332).

Here, when the gateway device 100A finds the other gateway device 100 (Yes in step S332), the third communication unit 135A of the gateway device 100A is loosely coupled with the retrieved gateway device 100 (step S334).

Subsequently, the gateway device 100A reads the stored information and transmits the read information to the retrieved gateway device 100 (step S336) and ends the series of processes.

Conversely, when the gateway device 100A may not retrieve the other gateway device 100 (No in step S332), the flowchart ends.

When the gateway device 100A determines in step S310 that the connection with the computer communication network 100A can be made (Yes), the gateway device 100A converts the protocol of the short-range wireless communication network BNT to the protocol of the computer communication network INT (step S312), transmits the stored information to the computer communication network INT (step S314), and ends the flowchart.

Conversely, when the gateway device 100A determines in step S306 that the connection with the computer communication network INT is not necessary (No), the gateway device 100A performs a process based on the received information (step S320) and ends the flowchart.

Although not illustrated, the gateway device 100 receiving the information performs the same processes as those of the flowchart.

According to the above-described embodiment, the following advantageous effects can be obtained.

(1) The gateway device 100A transmits the information I1 to the computer communication network INT when the gateway device 100A transmits the information I1 received from the electronic device 10 to the computer communication network INT and the gateway device 100A is connected to the computer communication network INT. Conversely, when the gateway device 100A may not be connected to the computer communication network INT, the other gateway devices 100 to which the gateway device 100A can be connected are retrieved and an attempt to be connected to the computer communication network INT via the retrieved gateway device 100 is performed. When the retrieved gateway device 100 can be connected to the computer communication network INT, the information I1 is transmitted to the computer communication network INT. When the retrieved gateway device 100 may not be connected to the computer communication network INT, the connectable gateway device 100 is further retrieved. In this way, by performing communication by the piconet in order via the plurality of gateway devices 100, it is possible to transmit the information I1 transmitted by the electronic device 10 to the computer communication network INT. Accordingly, it is possible to continue the connection between the electronic device 10 and the computer communication network INT and maintain stable communication.

(2) Since the gateway devices 100 are assumed to be installed in structures such as the streetlamps SL1 to SLN, telegraph poles, traffic signals, fire plugs, radio towers, and surveillance cameras or structures equivalent thereto, the gateway devices 100 can be installed broadly at a high density in a downtown. Therefore, it is possible to suppress communication output of the electronic device 10. Accordingly, by adopting the short-range wireless communication, the electronic device 10 can be reduced in size or weight. When the electronic device 10 is a wearable device, it is possible to improve wearing properties.

(3) In the electronic device 10, rich content is not good in a communication format due to a low consumption current. However, even when communication content is scant, the server 200 is notified of the moving of the device by a constant connection state by the loose coupling. Therefore, the server 200 can recognize a movement situation using AI such as deep learning, predict an action of a user, and link to a schedule of the user, so that the action of the user can be anticipated. Thus, for example, the server 200 enables the elevator EV to operate so that the elevator EV waits for the user. In a natural disaster, the server 200 can recognize where the user who is a rescue target is located even when the user does not perform an operation.

The embodiment has been described in detail above, but it should be apparent to those skilled in the art that many modifications can be made without substantially departing from novelties and advantageous effects of the invention. Accordingly, such modification examples are all included in the scope of the invention. For example, in the present specification and the drawings, the terms (the advertising packet, the Internet, the active scanning, and the like) along with the terms (the computer communication network INT and the electronic device 10) which are broader and equivalent can be replaced with other terms at least once in any portion of the present specification or the drawings. All the combinations of the embodiments and the modification examples are included in the scope of the invention. The configurations, the operations, and the like of the communication system 5, the electronic device 10, the gateway device 100, and the server 200 are not limited to those described in the embodiments, and various modifications can be embodied.

Each functional unit of the processing units 220, 120A, and 20 illustrated in FIG. 2 illustrates a functional configuration realized by cooperating hardware and software and specific mounting forms are not particularly limited. Accordingly, it is not necessary to mount hardware individually corresponding to each functional unit and the functions of the plurality of functional units can, of course, be realized by causing one processor execute programs. In the foregoing embodiments, some of the functions realized by software may be realized by hardware or some of the functions realized by hardware may also be realized by software.

REFERENCE SIGNS LIST 5 communication system
10 electronic device
20 processing unit
30 communication unit
40 power generation unit
50 storage unit
54 sensor unit
60 input unit
62 output unit
100, 100A, 100B, 100C gateway device
120A, 120B processing unit
130A, 130B first communication unit
135A, 135B third communication unit
140A, 140B second communication unit
150A, 150B storage unit
160A, 160B power generation unit
200 server
220 processing unit
230 communication unit
250 storage unit
WT1, WT2 watch
LD biological sensor device
HMD head mounted display device
SP information communication terminal
GW1 to GWN gateway devices
BNT short-range wireless communication network
INT computer communication network
SV server
EV elevator
HS smart house
RB robot
CA car
WD electronic device
SOL1 to SOLN solar panels
SL1 to SLN streetlamps

The invention claimed is:

1. A gateway device comprising:
a first communication unit that communicates with an electronic device, the first communication unit being configured to perform loose coupling short-range wireless communication;
a second communication unit that communicates with a computer communication network;
a third communication unit that communicates with a second gateway device different from the gateway device and has a different communication scheme from the second communication unit; and
a control unit that controls communication by the first communication unit, the second communication unit, and the third communication unit, the control unit being configured to:
control the electronic device and the computer communication network to communicate with each other via the second communication unit when the second communication unit is able to communicate with the computer communication network, and
control the third communication unit to enable the electronic device and the computer communication network to communicate with each other via the second gateway device when the second communication unit is not able to communicate with the computer communication network, wherein:
the loose coupling short-range wireless communication includes transmitting information from the electronic device to the gateway device via an advertising packet for making requests to the computer communication network.

2. The gateway device according to claim 1, wherein the third communication unit is configured to communicate with a third gateway device,
when the second communication unit is able to communicate with the computer communication network, the control unit performs control such that the electronic device and the computer communication network connected to the third gateway device are able to communicate with each other via the second communication unit, and
when the second communication unit is not able to communicate with the computer communication network, the control unit performs control such that the third communication unit enables the electronic device and the computer communication network connected to the third gateway device to communicate with each other via the second gateway device.

3. The gateway device according to claim 1, wherein the gateway device is installed in at least one of an outside lamp, a telegraph pole, a vending machine, a traffic signal, or a surveillance camera.

4. The gateway device according to claim 1, further comprising:
a power generation unit that generates power from natural energy, wherein
at least the first communication unit and the third communication unit are driven with the power generated by the power generation unit.

5. The gateway device according to claim 4, wherein the natural energy is one of solar light, wind power, ocean current, geotherm, and a natural gas.

6. The gateway device according to claim 1, wherein a communication scheme of the first communication unit is one of Bluetooth (registered trademark), Wi-SUN (registered trademark), ZigBee (registered trademark), and IP500 (registered trademark).

7. The gateway device according to claim 1, wherein the first communication unit and the third communication unit have the same communication scheme.

8. The gateway device according to claim 1, wherein the second communication unit performs communication with the computer communication network by wired connection.

9. The gateway device according to claim 1, wherein the second communication unit performs communication with the computer communication network by a mobile phone communication network.

10. The gateway device according to claim 1, wherein when the electronic device is connected to another gateway device for communication and a given deletion condition is established, a process of deleting information received from the electronic device or information transmitted to the electronic device is performed.

11. A communication system comprising:
the gateway device according to claim 1, and
an electronic device connected to the gateway device.

12. The gateway device according to claim 1, wherein the gateway device controls a length of a time period at which the gateway device transmits a request packet from the gateway device to the electronic device.

13. A gateway device comprising:
a first communication interface or circuit that communicates with an electronic device, the first communication interface or circuit being configured to perform loose coupling short-range wireless communication;
a second communication interface or circuit that communicates with a computer communication network;
a third communication interface or circuit that communicates with a second gateway device different from the gateway device and has a different communication scheme from the second communication interface or circuit; and
a processor configured to control communication by the first communication interface or circuit, the second communication interface or circuit, and the third communication interface or circuit, the processor being programmed to:
 control the electronic device and the computer communication network to communicate with each other via the second communication interface or circuit when the second communication interface or circuit is able to communicate with the computer communication network, and
 control the third communication interface or circuit to enable the electronic device and the computer communication network to communicate with each other via the second gateway device when the second communication interface or circuit is not able to communicate with the computer communication network, wherein:
the loose coupling short-range wireless communication includes transmitting information from the electronic device to the gateway device via an advertising packet for making requests to the computer communication network.

14. The gateway device according to claim 13, wherein
the third communication interface or circuit is configured to communicate with a third gateway device,
when the second communication interface or circuit is able to communicate with the computer communication network, the processor performs control such that the electronic device and the computer communication network connected to the third gateway device are able to communicate with each other via the second communication interface or circuit, and
when the second communication interface or circuit is not able to communicate with the computer communication network, the processor performs control such that the third communication interface or circuit enables the electronic device and the computer communication network connected to the third gateway device to communicate with each other via the second gateway device.

15. The gateway device according to claim 13, wherein the gateway device is installed in at least one of an outside lamp, a telegraph pole, a vending machine, a traffic signal, or a surveillance camera.

16. The gateway device according to claim 13, further comprising:
a power generation interface or circuit that generates power from natural energy, wherein
at least the first communication interface or circuit and the third communication interface or circuit are driven with the power generated by the power generation interface or circuit.

17. The gateway device according to claim 16, wherein the natural energy is one of solar light, wind power, ocean current, geotherm, and a natural gas.

18. The gateway device according to claim 13, wherein a communication scheme of the first communication interface or circuit is one of Bluetooth (registered trademark), Wi-SUN (registered trademark), ZigBee (registered trademark), and IP500 (registered trademark).

19. The gateway device according to claim 13, wherein the first communication interface or circuit and the third communication interface or circuit have the same communication scheme.

20. The gateway device according to claim 13, wherein the second communication interface or circuit performs communication with the computer communication network by wired connection.

21. The gateway device according to claim 13, wherein the second communication interface or circuit performs communication with the computer communication network by a mobile phone communication network.

22. The gateway device according to claim 13, wherein when the electronic device is connected to another gateway device for communication and a given deletion condition is established, a process of deleting information received from the electronic device or information transmitted to the electronic device is performed.

23. A communication system comprising:
the gateway device according to claim 13, and
an electronic device connected to the gateway device.

24. The gateway device according to claim 13, wherein the gateway device controls a length of a time period at which the gateway device transmits a request packet from the gateway device to the electronic device.

* * * * *